(12) United States Patent
Ando et al.

(10) Patent No.: US 12,607,795 B2
(45) Date of Patent: Apr. 21, 2026

(54) OPTICAL DEVICE

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Hiroshi Ando, Nisshin (JP); Masaaki Kawauchi, Nisshin (JP); Kojiro Tachi, Nisshin (JP); Masatoshi Tsuji, Nisshin (JP); Heng Liu, Nisshin (JP); Ryusuke Ohta, Toyota (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 0 days.

(21) Appl. No.: 19/235,976

(22) Filed: Jun. 12, 2025

(65) Prior Publication Data

US 2026/0079291 A1 Mar. 19, 2026

(30) Foreign Application Priority Data

Sep. 13, 2024 (JP) ................................. 2024-159217

(51) Int. Cl.
| | |
|---|---|
| *F21V 8/00* | (2006.01) |
| *B60R 1/10* | (2006.01) |
| *F21S 43/239* | (2018.01) |
| *F21S 43/245* | (2018.01) |

(52) U.S. Cl.
CPC .............. *G02B 6/0053* (2013.01); *B60R 1/10* (2013.01); *F21S 43/239* (2018.01); *F21S 43/245* (2018.01)

(58) Field of Classification Search
None
See application file for complete search history.

(56) References Cited

U.S. PATENT DOCUMENTS

| | | | | |
|---|---|---|---|---|
| 2023/0022565 A1* | 1/2023 | Ando | ..................... | G02B 5/045 |
| 2023/0280539 A1* | 9/2023 | Tsuji | ....................... | G02B 6/34 |
| | | | | 385/36 |
| 2023/0341605 A1* | 10/2023 | Ando | ................... | G02B 6/0055 |
| 2023/0375786 A1* | 11/2023 | Ando | ..................... | B60R 1/002 |
| 2025/0076586 A1* | 3/2025 | Ando | ..................... | G02B 6/34 |
| 2025/0172744 A1* | 5/2025 | Tsuji | ................... | G02B 6/0038 |
| 2025/0237800 A1* | 7/2025 | Ando | .................. | G02B 6/0016 |

FOREIGN PATENT DOCUMENTS

| | | |
|---|---|---|
| JP | 2016-026945 A | 2/2016 |
| JP | 2020-104662 A | 7/2020 |
| JP | 2023-174352 A | 12/2023 |

* cited by examiner

*Primary Examiner* — Christopher E Dunay
(74) *Attorney, Agent, or Firm* — Posz Law Group, PLC

(57) ABSTRACT

An optical device includes a light guide and a holding member to constitute a light guide unit having a corner and a corner extended outer surface. The corner extended outer surface includes a curved surface that has a radius of curvature of a predetermined standard value or more. A louver is arranged such that an imaginary spherical shape is spaced apart from prisms of the light guide in a state where the imaginary spherical shape is closest to the prisms while being in contact with the louver and the corner extended outer surface without intersecting with blades of the louver.

15 Claims, 19 Drawing Sheets

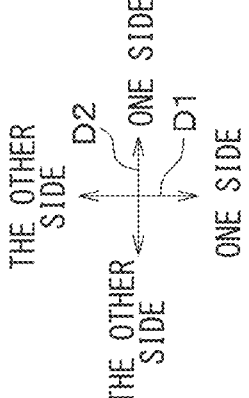
FIG. 1
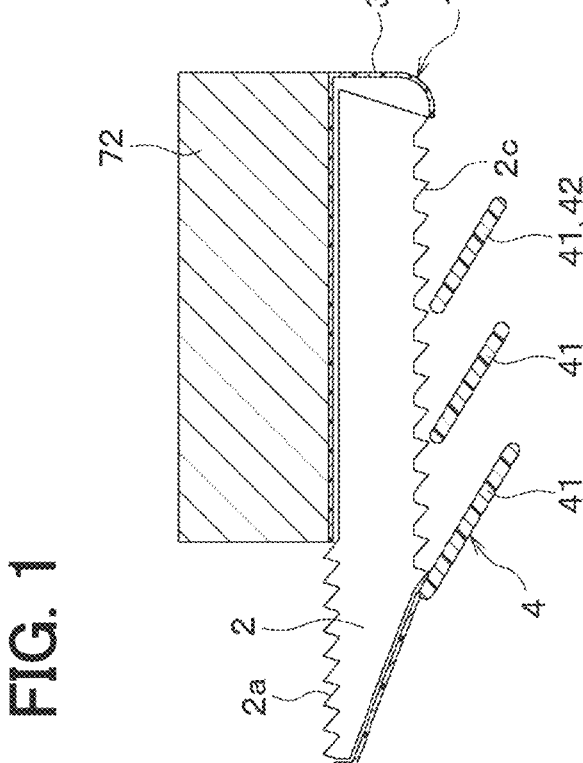

FIG. 11

OPTICAL DEVICE

CROSS REFERENCE TO RELATED APPLICATION

This application is based on Japanese Patent Application No. 2024-159217 filed on Sep. 13, 2024, the disclosure of which is incorporated herein by reference.

TECHNICAL FIELD

The present disclosure relates to an optical device including a light guide.

BACKGROUND

A blind spot assistance device is known as an optical device. The blind spot assistance device is disposed, for example, in the A-pillar portion of a vehicle, to display the blind spot due to the A-pillar portion for the driver.

SUMMARY

According to one aspect of the present disclosure, an optical device includes a light guide, a holding member, and a louver. The light guide is made of a translucent material, and has: an incident portion into which an external scene light is incident; an exit portion forming an outer surface on one side in a first direction; and a terminal portion forming an outer surface on one side in a second direction perpendicular to the first direction, opposite to the incident portion in the second direction. The holding member partially covers the light guide and holds the light guide. The louver is disposed on the one side of the exit portion in the first direction and held by the holding member. The louver has at least one blade to suppress the incidence of external light into the exit portion. The exit portion has prisms arranged in the second direction. The prism has a protruding shape to transmit a part of the incident light that has entered the light guide from the incident portion to outside of the light guide. The light guide and the holding member constitute a light guide unit. The light guide unit has: a corner located on one side of the light guide unit in the first direction and on one side of the light guide unit in the second direction; and a corner extended outer surface formed as an outer surface extending from the corner to the other side in the second direction to face the one side in the first direction at the other side in the second direction. The corner extended outer surface includes a curved surface having a radius of curvature of a predetermined standard or more at the corner and extends from the other side to the one side in the first direction while curving toward the other side in the second direction. The corner extended outer surface is formed as a part of the terminal portion or as a part of a terminal cover of the holding member that covers the terminal portion. The louver is arranged so that an imaginary spherical shape of the predetermined standard is separated from the prisms in a state where the imaginary spherical shape is closest to the prisms while being in contact with the louver and the corner extended outer surface without intersecting the blade.

BRIEF DESCRIPTION OF DRAWINGS

FIG. 1 is a schematic plan view showing a positional relationship between an optical device, a viewer, and a light blocking body in a first embodiment.

FIG. 11 is a cross-sectional view showing an optical device of a fifth comparative example in the same orientation as FIG. 2, corresponding to FIG. 7.

DETAILED DESCRIPTION

Figure 2:
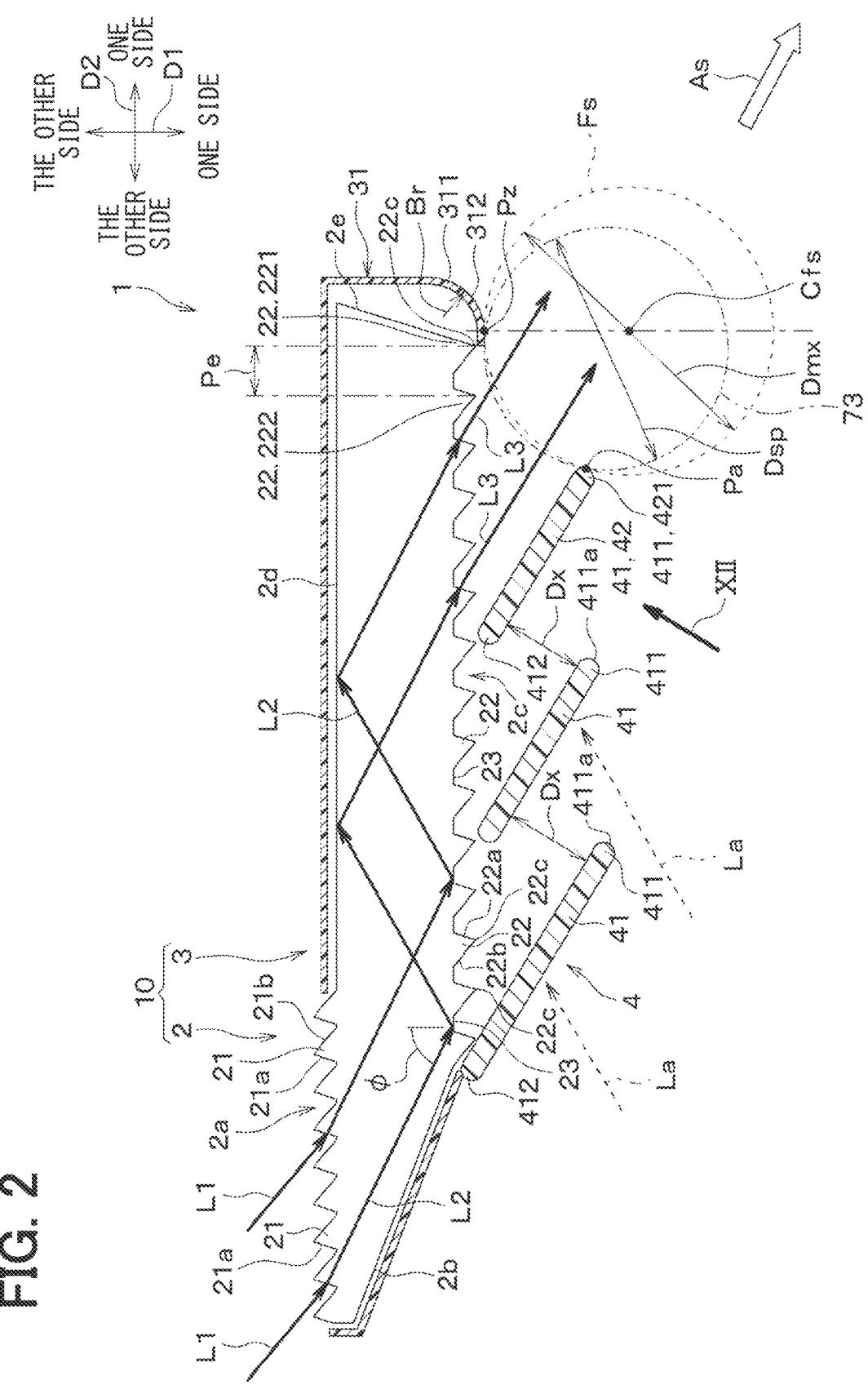
FIG. 2 is a schematic cross-sectional view illustrating the optical device of the first embodiment.

As an optical device, a blind spot assistance device is known. The blind spot assistance device is disposed, for example, in the A-pillar portion of a vehicle, and is capable of displaying an area that is the blind spot due to the A-pillar portion, for the driver, who is a viewer visually observing.

Specifically, the blind spot assistance device includes an optical member that is a light guide made of a light-transmitting material. The optical member has an entrance surface on which external light is incident, an exit surface having prisms and flat portions, and a smooth surface opposite to the flat portions. With this configuration, the optical member guides an external scene light incident from the entrance surface to the exit surface while internally reflecting the light, and transmits the light from the exit surface towards the viewer.

In the blind spot assistance device, each of the prisms provided on the exit surface of the light guide (in other words, the exit portion) has a prism shape, so that the tip of the prism is sharp. The blind spot assistance device does not have a structure to restrict an occupant from contacting the tip of the prism. Therefore, it cannot be said that the blind spot assistance device sufficiently ensures the safety of occupant. Furthermore, if standards are established to ensure the safety of occupant, the blind spot assistance device may not meet the requirements of the standards.

Therefore, the inventors came up with an idea of providing a louver having multiple blades on the exit portion of the light guide to restrict external light from entering the exit portion, and by narrowing the mutual spacing between the blades, to restrict occupants from coming into contact with the tip of the prism. However, if one were to simply use the louver to restrict occupants from coming into contact with the tip of the prism, it would be necessary to position the blade even closer to the occupant than the prism closest to the occupant. In this case, the blade located closest to the occupant will become a hindrance protruding towards the viewer in an optical device such as blind spot assistance device. The above has been found as a result of detailed studies by the inventors.

The present disclosure provides an optical device having a louver to ensure the safety of the viewer with a specified standard, to allow the blade of the louver to be positioned less likely to affect the viewer.

According to one aspect of the present disclosure, an optical device includes a light guide, a holding member, and a louver. The light guide is made of a translucent material, and has: an incident portion into which an external scene light is incident; an exit portion forming an outer surface provided on one side in a first direction; and a terminal portion forming an outer surface provided on one side in a second direction perpendicular to the first direction, opposite to the incident portion in the second direction. The holding member partially covers the light guide and holds the light guide. The louver is disposed on the one side of the exit portion in the first direction and held by the holding member. The louver has one or more blades to suppress the incidence of external light into the exit portion. The exit portion has prisms arranged in the second direction. The prism is formed in a protruding shape, to transmit a part of the incident light that has entered the light guide from the incident portion to outside of the light guide. The light guide and the holding member constitute a light guide unit. The light guide unit has: a corner located on the one side of the light guide unit in the first direction and on the one side of the light guide unit in the second direction; and a corner extended outer surface formed as an outer surface extending from the corner to the other side in the second direction to face the one side in the first direction at the other side in the second direction. The corner extended outer surface includes a curved surface having a radius of curvature of a predetermined standard or more at the corner to extend from the other side to the one side in the first direction while curving toward the other side in the second direction. The corner extended outer surface is formed as a part of the terminal portion or as a part of a terminal cover of the holding member that covers the terminal portion. The louver is arranged so that an imaginary spherical shape of the predetermined standard is separated from the prisms in a state where the imaginary spherical shape is closest to the prisms while being in contact with the louver and the corner extended outer surface without intersecting with the blades.

In this way, the corner of the light guide unit is rounded, and the imaginary spherical shape makes it impossible for the viewer to come into contact with the tip of the prism. In other words, it is possible to ensure the safety of the viewer due to the louver, using the imaginary spherical shape and a standard value defined in the predetermined standard.

Furthermore, by utilizing the corner extended outer surface as well as the blade, it is possible to restrict the imaginary spherical shape from coming into contact with the prism of the exit portion. Therefore, compared with a case where the imaginary spherical shape is restricted from contacting the prism simply by using the blade, the blade can be arranged at a position farther away from the viewer. Thus, the blade can be arranged so as not to be a hindrance to the viewer.

Hereinafter, embodiments will be described with reference to the drawings. In the following embodiments, the same reference numeral is given to the same or equivalent parts in the drawings.

First Embodiment

As shown in FIG. 1, an optical device 1 of this embodiment is used as a blind spot assistance device attached to a member or obstacle that blocks the field of view of a user (viewer 70) to generate a blind spot. The optical device 1 allows the viewer 70 to view the scene in the blind spot. In this embodiment, the optical device 1 is one of in-vehicle devices mounted on a vehicle, and is attached to a light blocking body 72 such as a pillar of the vehicle. The optical device 1 guides external scene light from the blind spot caused by the light blocking body 72 toward the viewer 70 who is a driver, and allows the viewer 70 to view the scene in the blind spot.

As shown in FIGS. 1 and 2, the optical device 1 includes a light guide 2, a housing 3, and a louver 4. In this embodiment, the light guide 2 and the housing 3 are collectively referred to as a light guide unit 10. An arrow As in FIG. 2 is defined toward the viewer 70. FIGS. 1 and 2 are cross-sections of the optical device 1 taken along a horizontal or approximately horizontal plane in the vehicle. FIG. 2 shows a cross-section taken along line II-II of FIG. 3.

The optical device 1 is attached to the light blocking body 72 to oppose the viewer 70. The optical device 1 allows the viewer 70 to see the blind spot by guiding external scene light inside the light guide 2 and transmitting it toward the viewer 70, and is configured so that the housing 3 and the louver 4 restrict unnecessary light from entering the light guide 2.

As shown in FIG. 2, the light guide 2 is formed in a plate shape having a thickness direction defined as a first direction D1. The light guide 2 has: an incident portion 2a; a reflective surface 2d adjacent to the incident portion 2a; an exit portion 2c opposite to the incident portion 2a and the reflective surface 2d; a side surface 2b connecting the incident portion 2a and the exit portion 2c; and a terminal surface 2e connecting the exit portion 2c and the reflective surface 2d.

The light guide 2 is a single transparent member made of a light-transmitting material. The light-transmitting material may be, for example, a resin material such as polyethylene terephthalate, polycarbonate, polyethylene, or acrylic, or an inorganic material such as glass. The light guide 2 has a mirrorless structure not having a mirror made of a reflective material different from the light-transmitting material, and is designed to guide the incident light from the incident portion 2a by total internal reflection.

Figure 3:
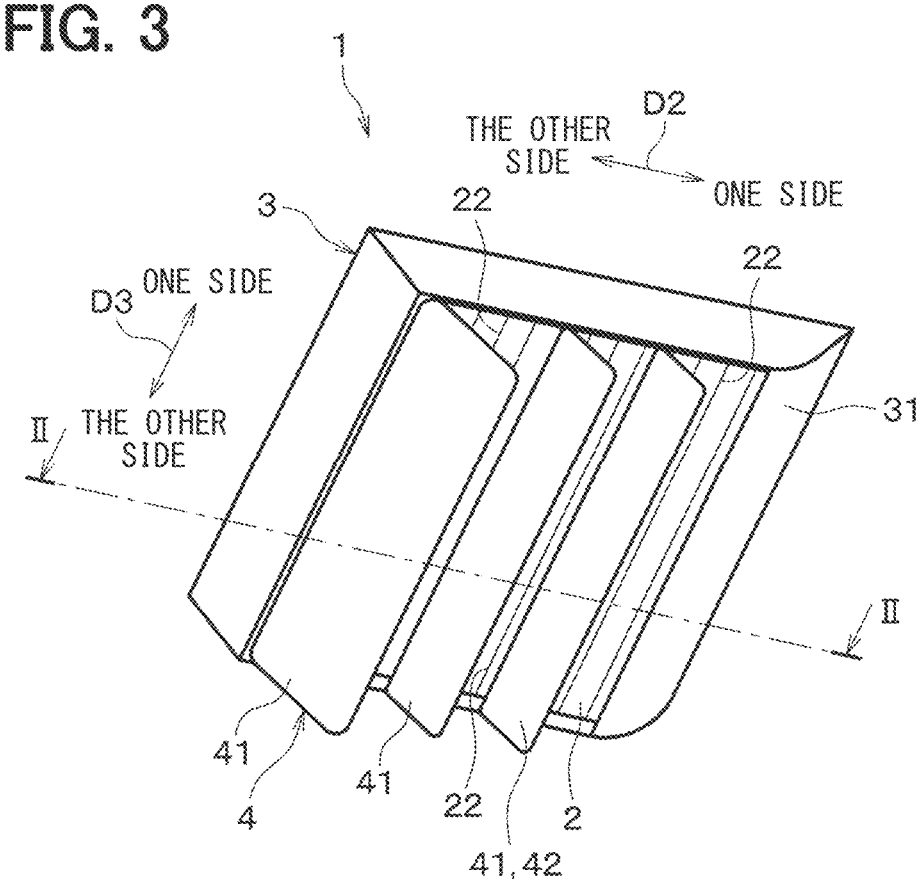
FIG. 3 is a schematic perspective view illustrating the optical device of the first embodiment.

As shown in FIGS. 2 and 3, for convenience, the first direction D1, a second direction D2, and a third direction D3 are defined to intersect with each other, more precisely, perpendicular to each other. In FIG. 2, one side in the first direction D1 is on the lower side of the paper, the other side in the first direction D1 is on the upper side of the paper. One side in the second direction D2 is on the right side of the paper, and the other side in the second direction D2 is on the left side of the paper. A light guide direction is defined from the other side to the one side in the second direction D2, in which the incident light L2 is guided inside the light guide 2.

The external scene light L1 is incident on the incident portion 2a of the light guide 2. The incident portion 2a has entrance prisms 21. The entrance prism 21 is protrusion having a triangular shape when viewed in the third direction D3, and extends in the third direction D3. The entrance prisms 21 are arranged parallel to one another. As shown in FIG. 2, the entrance prism 21 has an entrance surface 21a, which is a side surface on the other side of the triangular shape in the second direction D2, and an adjacent surface 21b, which is a side surface on the one side of the triangular shape in the second direction D2.

The entrance surface 21a of the entrance prism 21 allows a part of the external scene light L1 traveling from the other side in the first direction D1 toward the entrance surface 21a to enter the light guide 2. The entrance prisms 21 are arranged such that the heights from the reflective surface 2d to the other side in the first direction D1 are substantially the same, and that the entrance surfaces 21a are substantially parallel to each other. The "substantially the same" includes not only a case where they are completely the same, but also a case where they are almost the same but not completely the same due to unavoidable errors such as processing errors. The adjacent surface 21b of the entrance prism 21 has an inclination angle that is equal to or smaller than a predetermined value so as not to impede the entrance of the external scene light L1 to the entrance surface 21a of the entrance prism 21 adjacent to the adjacent surface 21b.

For convenience, as shown in FIG. 2, a part of the external scene light L1 that enters the light guide 2 from the incident portion 2a may be referred to as incident light L2. Furthermore, a part of the incident light L2 transmitted from the exit prism 22 to the outside of the light guide 2 may be referred to as an exit light L3.

The side surface 2b has an inclination of at least the incident angle φ of the incident light L2 so that the incident light L2 is not transmitted to the outside from the side surface 2b. The incident angle φ of the incident light L2 is defined as an angle between the traveling direction of the incident light L2 and a normal direction to a plane formed by the side surface 2b, the flat surface 23, or the reflective surface 2d. Assuming that the refractive index of the constituent material of the light guide 2 is n and the external medium is air with a refractive index of 1. The light guide 2 is capable of guiding light in the mirrorless structure by satisfying the total reflection condition of Formula F1 that is $\sin \varphi \geq 1/n$.

The exit portion 2c forms an outer surface of the light guide 2 on one side in the first direction D1, to transmit a part of the incident light L2 to the outside of the light guide 2. Specifically, the exit portion 2c has plural exit prisms 22 and plural flat surfaces 23. The exit prism 22 corresponds to a prism of the present disclosure.

Figure 4:
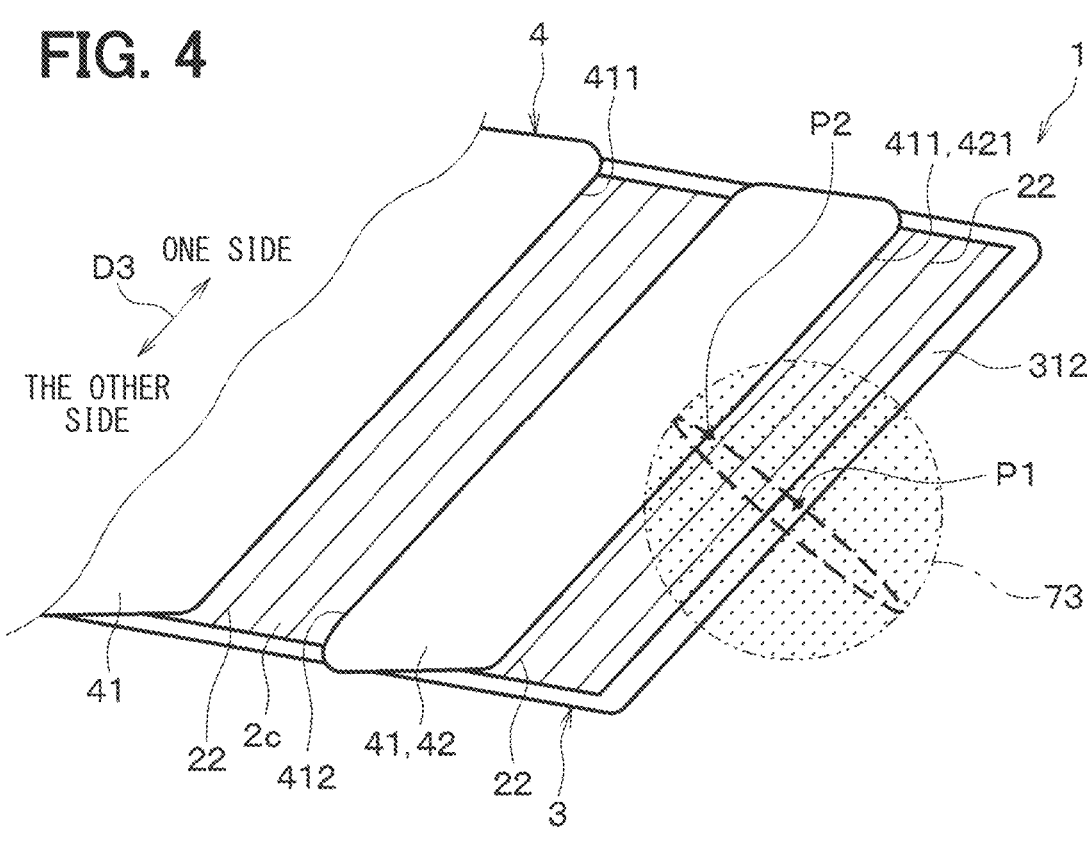
FIG. 4 is another schematic perspective view of the optical device of the first embodiment in a different orientation from that in FIG. 3.

The exit portion 2c has a surface where the incident light L2 from the incident portion 2a first reaches, and the exit prisms 22 and the flat surface 23 are arranged alternately in the second direction D2. As shown in FIGS. 2 to 4, each of the exit prisms 22 is formed as a protrusion that has a triangular shape when viewed in a direction along the third direction D3. The exit prisms are arranged parallel to each other to extend along the third direction D3. Each of the flat surfaces 23 is a plane substantially parallel to the reflective surface 2d and extends along the third direction D3.

As shown in FIG. 2, the exit prism 22 has an exit surface 22a, which is one side of the triangular shape of the exit prism 22 in the second direction D2, and the other surface 22b, which is the other side of the triangular shape in the second direction D2. The exit surface 22a is, for example, parallel to the entrance surface 21a and transmits a part of the incident light L2 to the outside of the light guide 2.

Each of the exit prisms 22 has an apex of the triangular shape of the exit prism 22 as a tip 22c of the exit prism 22. For example, since the exit prisms 22 form the same triangular shape when viewed in a direction along the third direction D3, the positions of the tips 22c are aligned with each other in the first direction D1.

The flat surfaces 23 are located, for example, on the same plane as one another, and reflect a part of the incident light L2 into the light guide 2. That is, each of the flat surfaces 23 is a first reflecting surface that reflects the incident light L2 that has reached the flat surface 23 toward the reflective surface 2d by total reflection.

The exit prism 22 of the exit portion 2c located on the furthest side in the second direction D2 may be referred to as a first exit prism 221. Among the exit prisms 22, the exit prism 22 adjacent to the first exit prism 221 on the other side in the second direction D2 may be referred to as a second exit prism 222. The first exit prism 221 corresponds to a first prism of the present disclosure, and the second exit prism 222 corresponds to a second prism of the present disclosure.

The reflective surface 2d is formed as an outer surface of the light guide 2 facing the other side in the first direction D1, and reflects the incident light L2 reflected by the flat surfaces 23 toward the exit portion 2c. That is, the reflective surface 2d is a second reflecting surface that reflects the incident light L2 reflected by the flat surface 23 toward the exit portion 2c by total reflection. When the exit portion 2c facing the viewer 70 is defined as a front surface, the reflective surface 2d corresponds to a back surface. The entire area of the reflective surface 2d is covered by the housing 3 with a gap therebetween so that the external scene light L1 is not incident thereon.

The terminal surface 2e in this embodiment is provided as a terminal portion that forms an outer surface of the light guide 2 on one side in the second direction D2, opposite to the incident portion 2a in the second direction D2. The terminal surface 2e is connected to the exit portion 2c at one end of the exit portion 2c in the second direction D2, and is connected to the reflective surface 2d at one end of the reflective surface 2d in the second direction D2. As a result, a part of the incident light L2 finally reaches the terminal surface 2e. In this embodiment, the terminal surface 2e forms a single plane together with the exit surface 22a of the first exit prism 221, but may have the other shape.

Although not shown, the light guide 2 has one end face on the one side in the third direction D3 and the other end face on the other side in the third direction D3. The one end face and the other end face are non-optical surfaces not used for guiding the incident light L2 inside the light guide 2, i.e., not used for reflection, similar to the side surface 2b.

As shown in FIGS. 2 and 3, the housing 3 functions as a holding member for holding the light guide 2. For example, since the light guide 2 is fixed to the housing 3, the light guide 2 cannot move relative to the housing 3.

The light guide 2 is housed in the housing 3, and the housing 3 partially covers the light guide 2. In this embodiment, the housing 3 covers the side surface 2b, the reflective surface 2d, the terminal surface 2e, the one end face, and the other end face of the light guide 2 with gap therebetween. In short, the housing 3 covers the light guide 2 except for the incident portion 2a and the exit portion 2c. The housing 3 has openings at positions corresponding to the incident portion 2a and the exit portion 2c, and the incident portion 2a and the exit portion 2c are exposed from the housing 3. A part of the housing 3 that covers the terminal surface 2e of the light guide 2 is referred to as a terminal cover portion 31.

The housing 3 functions as a light-shielding cover that restricts external light La from entering a part of the light guide 2 covered by the housing 3. The external light La is outside of the light guide 2, and the external scene light L1 is one type of the external light La.

Since the housing 3 functions as a light-shielding cover, it is preferable that the opaque portion of the housing 3 is made of a black light-shielding material having a visible light absorptance of a predetermined level or higher. For example, both the inner and outer surfaces of the opaque portion of the housing 3 are matte black. In the present embodiment, the entire housing 3 is opaque. The matte black surface of the housing 3 may be realized by the base material of the housing 3 itself, or may be realized by coating the surface.

The terminal cover portion 31 of the housing 3 has a corner 311 located at a corner of the light guide unit 10 on one side in the first direction D1 and on one side in the second direction D2. The corner 311 of the light guide unit 10 forms a corner of the light guide unit 10 and also forms a corner of the terminal cover portion 31. The terminal cover portion 31 extends from a position overlapping the one side of the terminal surface 2e in the second direction D2, through the corner 311, so as to cover the tip 22c of the first exit prism 221.

The terminal cover portion 31 has a corner extended outer surface 312 that occupies a part of the outer surface of the light guide unit 10. The corner extended outer surface 312 is formed as a part of the terminal cover portion 31. The corner extended outer surface 312 extends from the corner 311 to the other side in the second direction D2, and the other side of the corner extended outer surface 312 in the second direction D2 is formed as an outer surface facing the one side in the first direction D1.

In detail, a curved portion of the corner extended outer surface 312 has a radius of curvature equal to or greater than a predetermined standard value Br at the corner 311 (hereinafter referred to as corner radius standard Br) and extends from the other side to the one side in the first direction D1 while curving to the other side in the second direction D2. In other words, the curved portion of the corner extended outer surface 312 is formed as a corner round surface having a radius equal to or greater than the corner radius standard Br when viewed in the third direction D3. In this embodiment, the corner extended outer surface 312 is composed of the corner round surface which is the curved portion, and a planar extension surface which extends a short distance from the corner round surface to the other side in the second direction D2 to face the one side in the first direction D1. The corner extended outer surface 312 extends linearly along the third direction D3 while maintaining a surface configuration having the corner round surface and the extension surface.

The corner radius standard Br is determined by a public standard such as safety standard for road transport vehicle. In other words, the above-mentioned predetermined standard that determines the corner radius standard Br is preferably a safety standard that ensures the safety of passengers including the viewer 70. Specifically, the corner radius standard Br is set at 3.2 mm in accordance with the contents of the passenger equipment section of the safety standard for road transport vehicle. In this embodiment, the radius of curvature of the convexly curved portion of the corner extended outer surface 312 is 3.2 mm or more. Since safety standards for a blind spot assistance device have not yet been established at the time of filing this application, the corner radius standard Br of 3.2 mm is a value adopted from technical standards for impact absorption of sun visors, which are included in the safety standard for road transport vehicle.

As shown in FIGS. 2 to 4, the louver 4 has plural blades 41 held by the housing 3. Specifically, each of the blades 41 is fixed to the housing 3. The blades 41 are flat and disposed on one side of the exit portion 2c in the first direction D1.

The blades 41 are formed to suppress the incidence of external light La into the exit portion 2c, and not to block the exit light L3 traveling from the exit surface 22a of the exit prism 22 toward the viewer 70. For example, each of the blades 41 extends along the exit light L3 traveling from exit portion 2c toward a predetermined assumed position of the eye of the viewer 70. Further, the entire surface of the blade 41 is matte black, similar to the surface of the housing 3.

Specifically, the blades 41 are arranged at intervals in the second direction D2 and extend along the third direction D3. The blades 41 are arranged parallel or approximately parallel to each other, and inclined with respect to the first direction D1 so as to be positioned closer to the one side in the second direction D2 as extending to the one side in the first direction D1. As a result, the blades 41 are arranged parallel or approximately parallel to the line of sight direction from the viewer 70 to the exit portion 2c, thereby minimizing the obstruction of the exit portion 2c from the viewer 70. The blade 41 located on the most one side in the second direction D2 may be referred to as a terminal blade 42.

The blade 41 has a front end 411 on one side in the first direction D1 and a rear end 412 on the other side in the first direction D1. Each of the front end 411 and the rear end 412 extends linearly in the third direction D3.

The front surface 411a of the front end 411 is curved with a radius of curvature equal to or greater than the corner radius standard Br in a cross-section perpendicular to the third direction D3 in which the front end 411 extends, i.e., in the cross-section of FIG. 2. In short, the front surface 411a of the front end 411 is curved with a radius of curvature of 3.2 mm or more. The front end 411 of the terminal blade 42 may be referred to as a terminal-side front end 421. The terminal-side front end 421 is located on one side of the corner 311 of the light guide unit 10 in the first direction D1 and on the other side of the corner 311 in the second direction D2.

Figure 5:
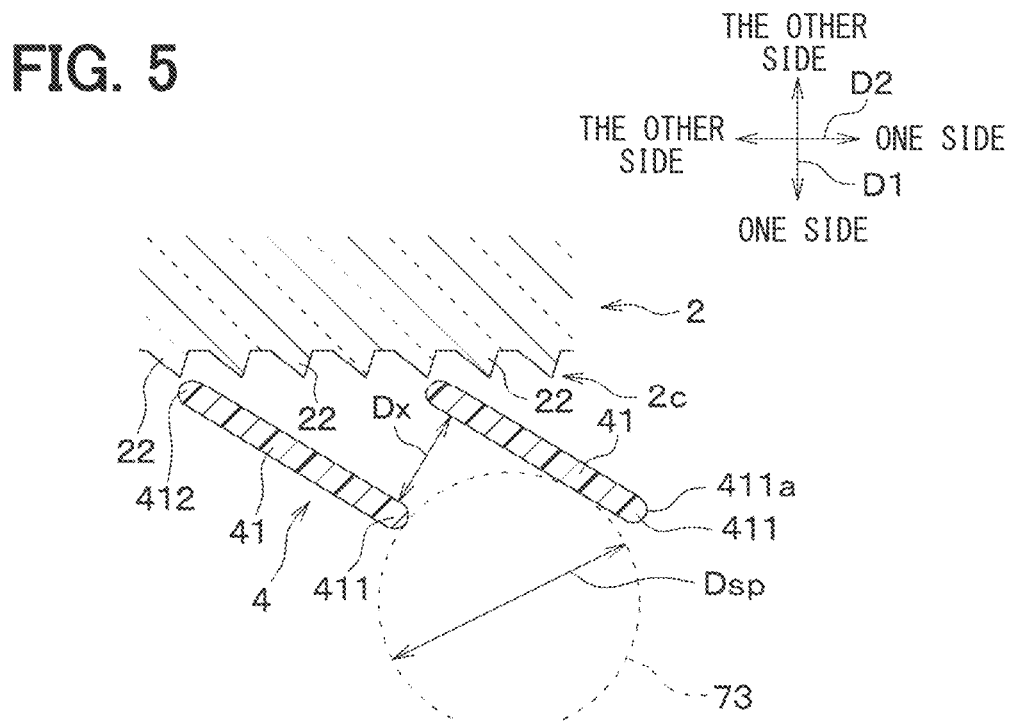
FIG. 5 is an enlarged cross-sectional view of a light guide and a louver of FIG. 2.

As shown in FIGS. 2 and 5, the interval Dx between the blades 41 is less than an imaginary spherical diameter Dsp, which is a diameter of the imaginary spherical shape 73. The blades 41 restrict the imaginary spherical shape 73 from passing between the blades 41 and contacting the exit prism 22 from one side of the blades 41 in the first direction D1.

The imaginary spherical shape 73 is determined according to the predetermined standard that determines the corner radius standard Br. In detail, since the imaginary spherical shape 73 is defined as a spherical rigid-body head model in the passenger equipment section of the safety standard for road transport vehicle, the imaginary spherical diameter Dsp in this embodiment is set to 165 mm in accordance with the safety standard for road transport vehicle. As described above, since safety standards for blind spot assistance device have not yet been established at the time of filing the present application, the imaginary sphere diameter Dsp of 165 mm is a value adopted from the technical standards for impact absorption of sun visors, which are included in the safety standard for road transport vehicle.

The imaginary spherical shape 73 is restricted from contacting the exit prism 22 of the exit portion 2c from one side in the first direction D1, between the terminal blade 42 and the corner extended outer surface 312 of the terminal cover portion 31. Specifically, the louver 4 is arranged so that the imaginary spherical shape 73 is spaced apart from all of the exit prisms 22 of the exit portion 2c in a specified arrangement state of FIG. 2. The specified arrangement state represents a state in which the imaginary spherical shape 73 is closest to the exit prism 22 while contacting the terminal blade 42 and the corner extended outer surface 312 without intersecting with the blades 41. In the specified arrangement state, the imaginary spherical shape 73 is in contact with the terminal-side front end 421 of the terminal blade 42.

As shown in FIGS. 2 and 4, the position of the imaginary spherical shape 73 in the first direction D1 and the second direction D2 in the specified arrangement state are fixed not to change even if the imaginary spherical shape 73 is displaced in the third direction D3. This is because each of the corner extended outer surface 312 and the terminal-side front end 421 extends linearly in the third direction D3. In FIG. 4, a point P1 represents a contact point between the imaginary spherical shape 73 and the corner extended outer surface 312, and a point P2 represents a contact point between the imaginary spherical shape 73 and the terminal-side front end 421.

In order to establish a configuration in which the imaginary spherical shape 73 is separated from all of the exit prisms 22 in the specified arrangement state, in the optical device 1 of this embodiment, Formula F2 of Dmx<Dsp+Pe/2 is satisfied.

As shown in FIG. 2, in Formula F2, Dsp is a diameter of the imaginary spherical shape 73, and Pe is a pitch between the first exit prism 221 and the second exit prism 222 in the second direction D2. Furthermore, Dmx is a diameter of the largest imaginary spherical surface Fs that satisfies all of the following Conditions C1 to C4.

Condition C1: The imaginary spherical surface Fs is provided on one side of the corner extended outer surface 312 in the first direction D1.

Condition C2: The imaginary spherical surface Fs has a spherical center Cfs at the same position in the second direction D2 as the most one-side point Pz of the corner extended outer surface 312. The most one-side point Pz is a point located on the one side of the curved portion (in other words, the corner round surface) of the corner extended outer surface 312 in the first direction D1.

Condition C3: The imaginary spherical surface Fs passes through the most one-side point Pz of the corner extended outer surface 312.

Condition C4: The imaginary spherical surface Fs is tangent to the terminal-side front end 421.

In this embodiment, the imaginary spherical surface Fs is in contact with the terminal-side front end 421 at the blade contact point Pa in FIG. 2.

Figure 6:
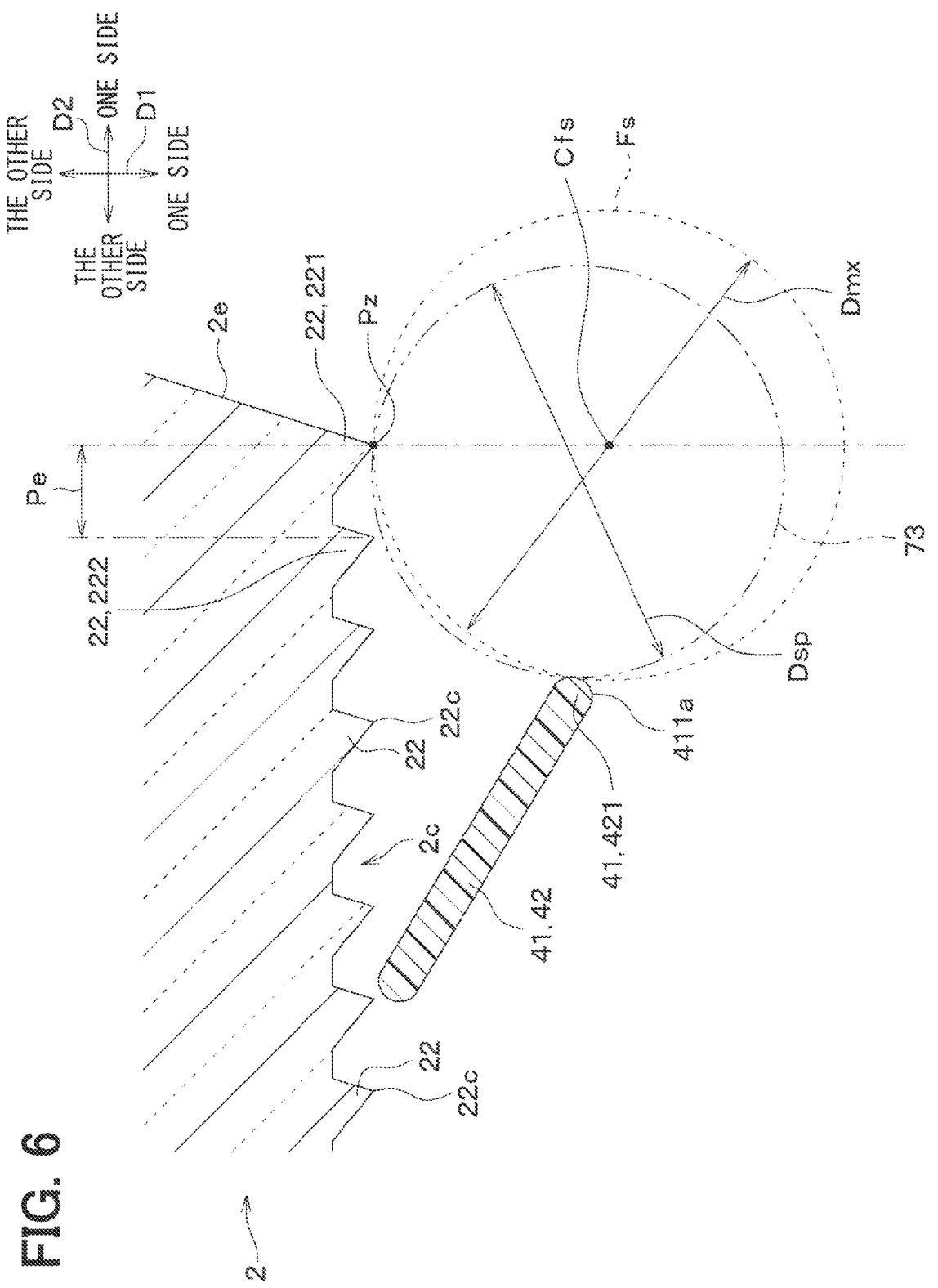
FIG. 6 is a cross-sectional view showing a terminal blade of a louver in a reference example, in the description of the first embodiment, in the same orientation as FIG. 2.

A reference example shown in FIG. 6 will be described to explain why the imaginary spherical shape 73 is separated from all of the exit prisms 22 in the specified arrangement state if Formula F2 is satisfied. In the reference example of FIG. 6, compared to the present embodiment shown in FIG. 2, the largest imaginary spherical surface Fs that satisfies all of Conditions C1 to C4 is shown when the housing 3 is absent and the most one-side point Pz is located at the tip 22c of the first exit prism 221. Formula F2 is satisfied in the reference example of FIG. 6.

In the reference example shown in FIG. 6, if the relationship of Formula F3 of Dmx=Dsp+Pe/2 is satisfied, the following can be said about the arrangement of the imaginary spherical shape 73. In this case, when the imaginary spherical shape 73 is positioned to be in contact with the first exit prism 221 at the most one-side point Pz and the terminal-side front end 421, the imaginary spherical shape 73 will be in contact with the tip 22c of the second exit prism 222.

However, in the reference example of FIG. 6, the inequality relationship of Formula F2 is established. When the imaginary spherical shape 73 is positioned to be in contact with the first exit prism 221 at the most one-side point Pz and the terminal-side front end 421, the imaginary spherical shape 73 is separated from the second exit prism 222.

In the present embodiment of FIG. 2, when the imaginary spherical shape 73 is positioned to be in contact with the corner extended outer surface 312 and the terminal-side front end 421 in the specified arrangement state, the imaginary spherical shape 73 will be further away from the second exit prism 222 than in the arrangement of FIG. 6. In this embodiment, the terminal cover portion 31 extends to cover the tip 22c of the first exit prism 221. For this reason, in the present embodiment of FIG. 2, if the relationship of Formula F2 is established, the imaginary spherical shape 73 is separated from all of the exit prisms 22 in the specified arrangement state.

Next, the effects of the optical device 1 of this embodiment will be described with reference to first to fifth comparative examples shown in FIGS. 7 to 11.

Figure 7:
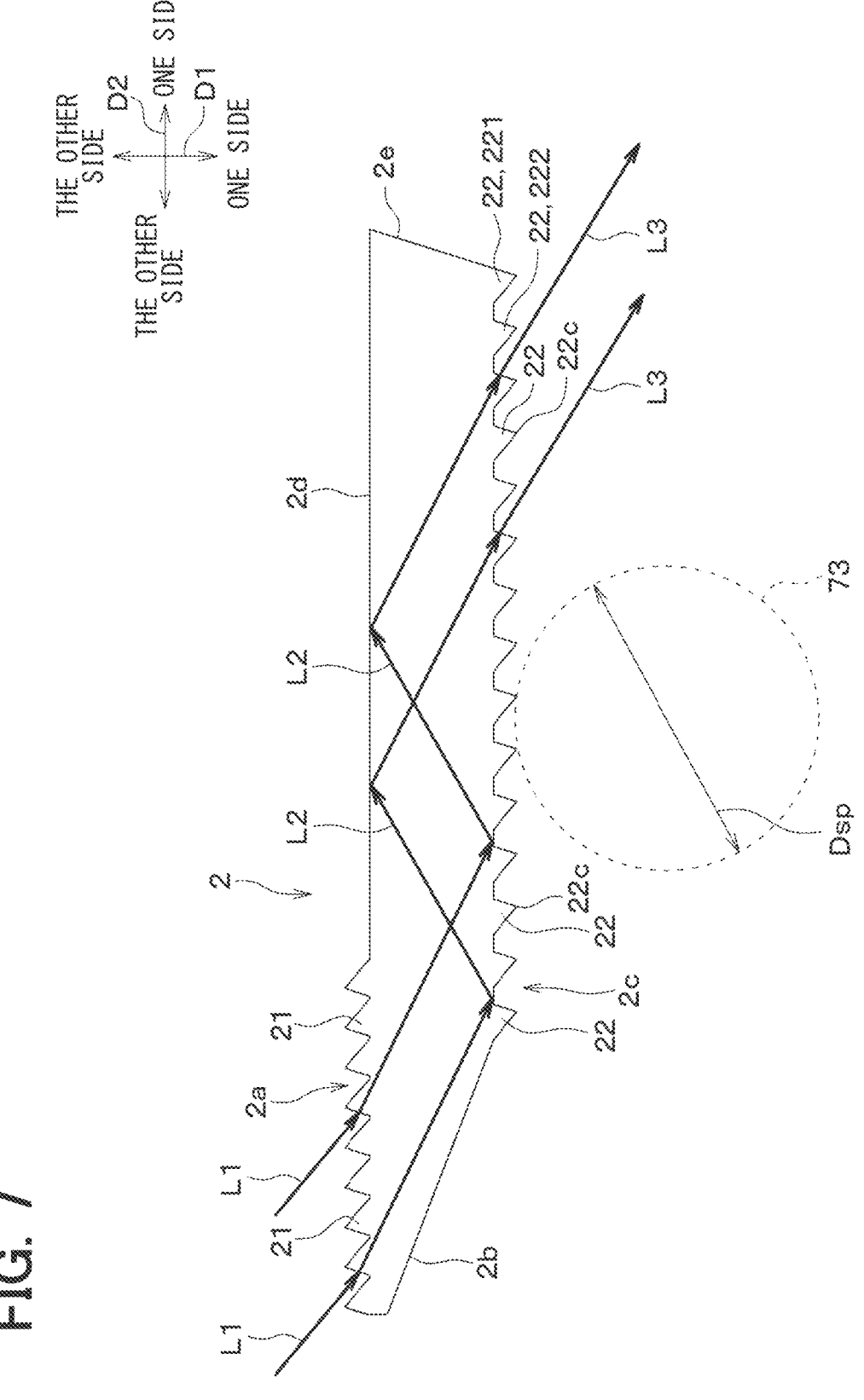
FIG. 7 is a cross-sectional view showing an optical device of a first comparative example in the same orientation as FIG. 2.
Figure 8:
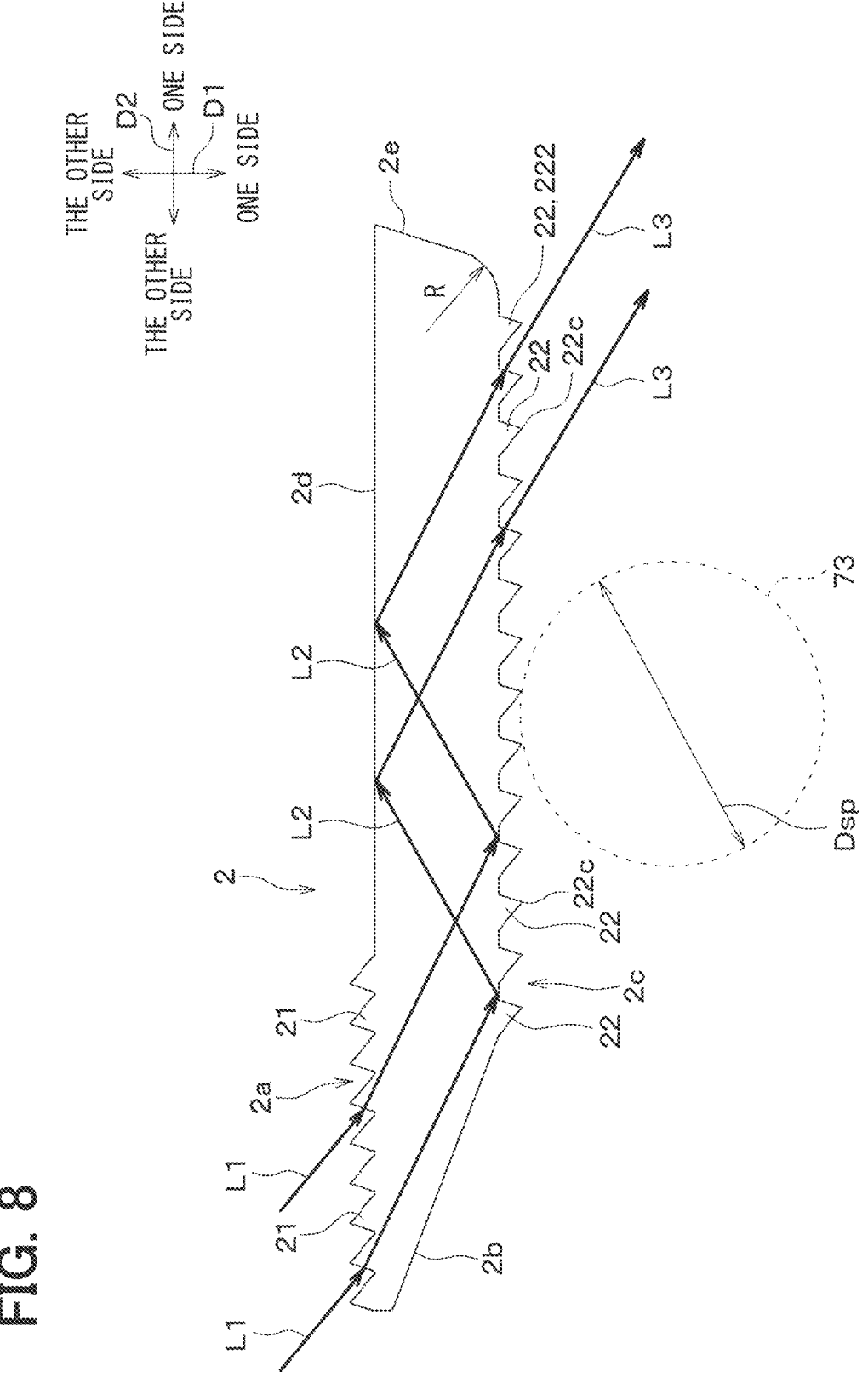
FIG. 8 is a cross-sectional view showing an optical device of a second comparative example in the same orientation as FIG. 2, corresponding to FIG. 7.
Figure 9:
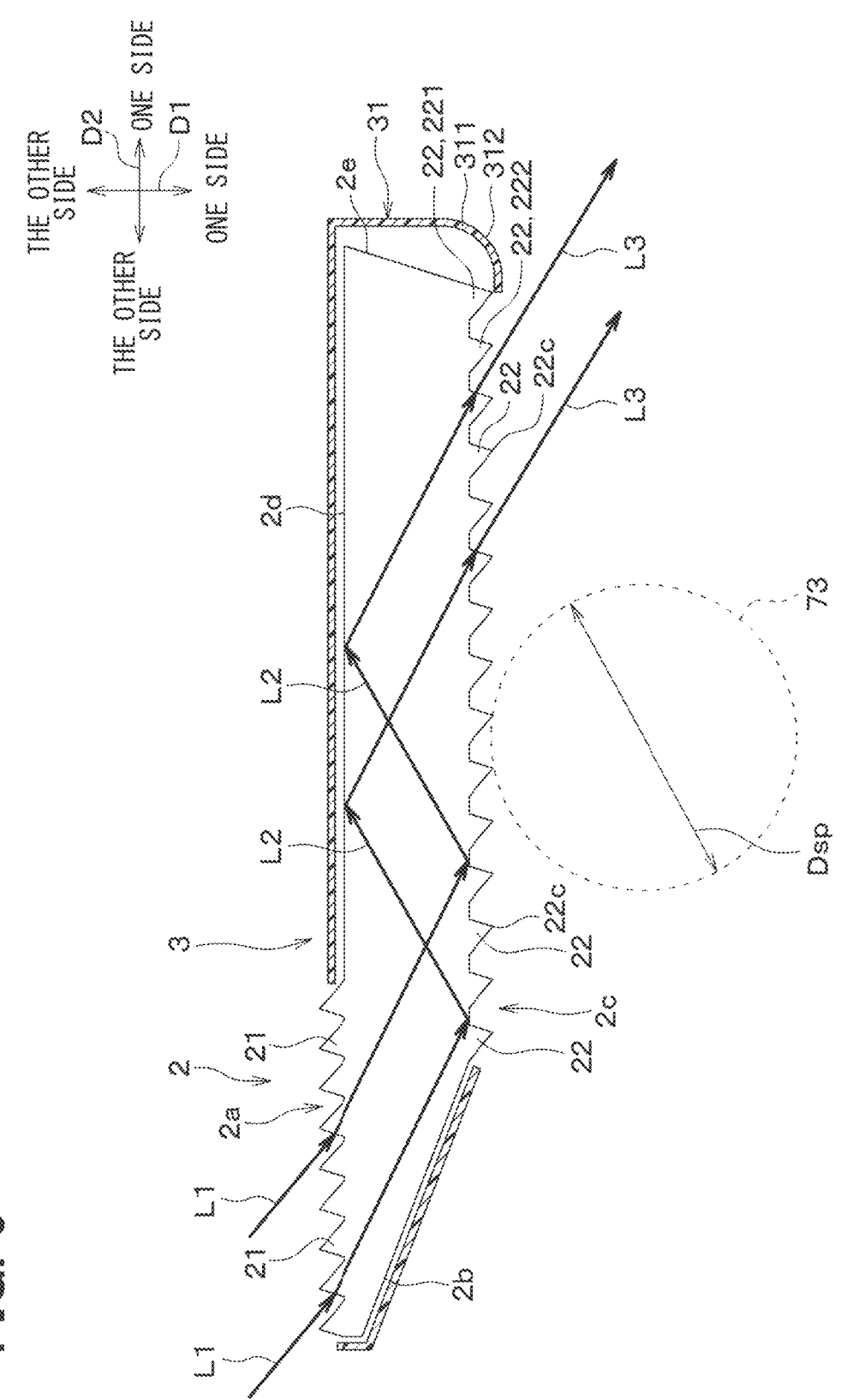
FIG. 9 is a cross-sectional view showing an optical device of a third comparative example in the same orientation as FIG. 2, corresponding to FIG. 7.

An optical device of a first comparative example in FIG. 7 includes the light guide 2 as in this embodiment, but does not include the housing 3 and the louver 4, compared with the optical device 1 of this embodiment. An optical device of a second comparative example in FIG. 8, compared with the optical device of the first comparative example, the light guide 2 does not have the first exit prism 221, and has a corner round shape at a boundary between the exit portion 2c and the terminal surface 2e. An optical device of a third comparative example in FIG. 9 includes the light guide 2 and the housing 3, but does not include the louver 4, compared with the optical device 1 of this embodiment. In the first to third comparative examples, the imaginary spherical shape 73 serving as a spherical rigid-body head model easily comes into contact with the exit prism 22 from one side in the first direction D1, as shown in FIGS. 7 to 9.

Figure 10:
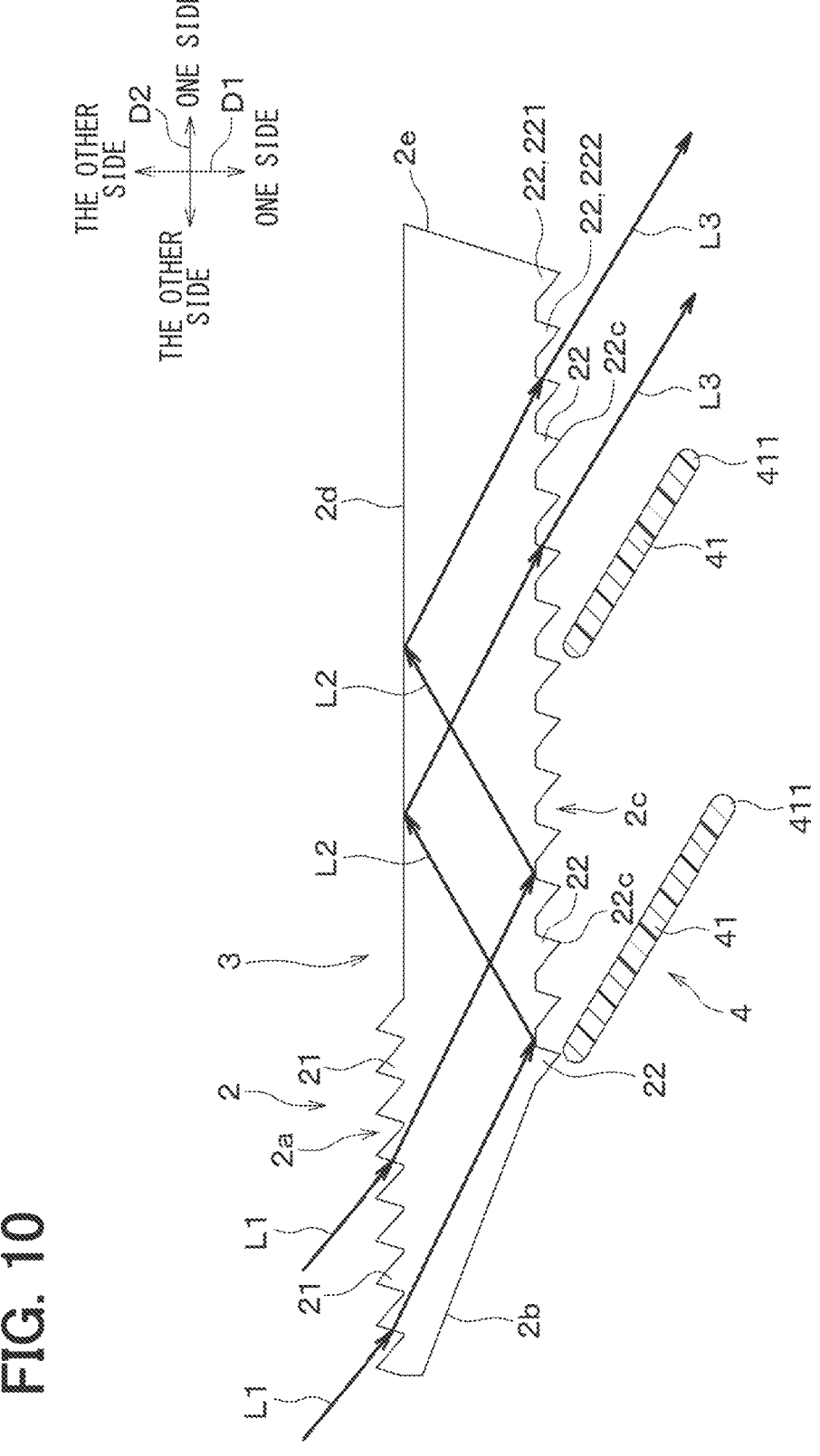
FIG. 10 is a cross-sectional view showing an optical device of a fourth comparative example in the same orientation as FIG. 2, corresponding to FIG. 7.

An optical device of a fourth comparative example in FIG. 10 has the light guide 2 and the louver 4 but does not have the housing 3, compared with the optical device 1 of this embodiment. Further, as shown in FIG. 10, in the optical device of the fourth comparative example, all of the blades 41 of the louver 4 are positioned on the other side of the first exit prism 221 in the second direction D2, compared with the optical device 1 of this embodiment. As shown in FIG. 10, in the fourth comparative example, the imaginary spherical shape 73 easily comes into contact with the first exit prism 221 and the exit prism 22 adjacent to the first exit prism 221 from one side in the first direction D1.

Figure 11:
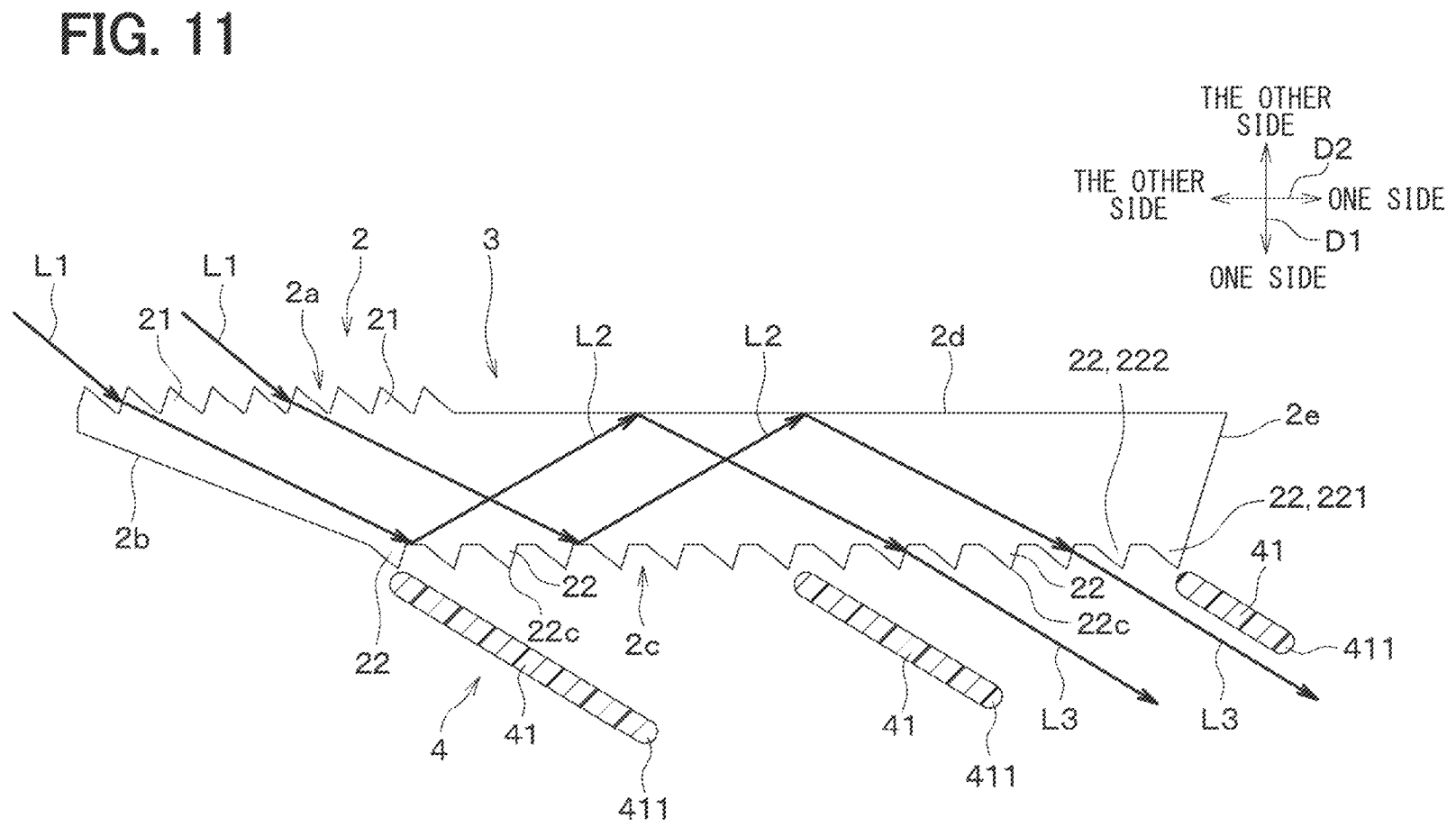

In an optical device of a fifth comparative example in FIG. 11, compared with the fourth comparative example, some of the blades 41 of the louver 4 extend diagonally from the first exit prism 221 to one side in the second direction D2. Except for this point, the optical device of the fifth comparative example is similar to the optical device of the fourth comparative example. In the fifth comparative example, as shown in FIG. 11, the louver 4 restricts the imaginary spherical shape 73 from contacting the exit prisms 22 of the exit portion 2c from one side in the first direction D1. However, in the fifth comparative example, the blade 41 located the most one side in the second direction D2 protrudes toward the viewer 70 and thus becomes a nuisance. In the fifth comparative example, the blade 41 protruding toward the viewer 70 may restrict the field of vision of the viewer 70.

The optical device 1 of this embodiment is configured to solve the issues associated with the first to fifth comparative examples. For example, according to this embodiment, as shown in FIG. 2, the corner extended outer surface 312 includes a curved portion at the corner 311 to have a radius of curvature that is equal to or greater than the corner radius standard Br and extends from the other side to the one side in the first direction D1 while curving to the other side in the second direction D2. The louver 4 is disposed so that the imaginary spherical shape 73 is spaced apart from all of the exit prisms 22 of the exit portion 2c in the specified arrangement state. In the specified arrangement state, the imaginary spherical shape 73 is closest to the exit prism 22 while contacting the terminal blade 42 and the corner extended outer surface 312 without intersecting the blades 41.

Therefore, the corner 311 of the light guide unit 10 is rounded, and the imaginary spherical shape 73 cannot come into contact with the tips 22c of the exit prisms 22 from the viewer 70. Since both the corner radius standard Br and the imaginary spherical shape 73 are defined by the common predetermined standard, it is possible to ensure the safety of the viewer 70 due to the louver 4, using the imaginary spherical shape 73 and the corner radius standard Br defined by the predetermined standard.

The corner extended outer surface 312 can be used without relying only on the blade 41 to restrict the imaginary spherical shape 73 from coming into contact with the exit prism 22. Therefore, in this embodiment, as compared to the fifth comparative example in FIG. 11, since the blade 41 can be positioned farther away from the viewer 70, the blade 41 can be positioned less likely to be a hindrance to the viewer 70. Furthermore, since the blades 41 are arranged not to be an obstacle to the viewer 70, the field of vision of the viewer 70 will be not affected. In this manner, the issues described in the first to fifth comparative examples are solved in this embodiment.

(1) According to this embodiment, as shown in FIG. 2, the exit portion 2c has the flat surfaces 23 to reflect a part of the incident light L2 into the light guide 2, in addition to the exit prisms 22. The light guide 2 has the reflective surface 2d formed as the outer surface of the light guide 2 facing the other side in the first direction D1, to reflect the incident light L2 reflected by the flat surfaces 23 toward the exit portion

2c. Therefore, the incident light L2 can be guided in the second direction D2 by internal reflection in the light guide 2.

(2) According to this embodiment, as shown in FIG. 2, the housing 3 has the terminal cover portion 31, and the corner extended outer surface 312 is formed as a part of the terminal cover portion 31. Since it is not necessary for the light guide 2 to have a corner round surface having a curvature radius equal to or larger than the corner radius standard Br, it is possible to reduce restrictions on the shape of the light guide 2.

(3) In the optical device 1 of this embodiment, the relationship of Formula F2 is satisfied. Therefore, the arrangement of the louver 4 can be determined so that the imaginary spherical shape 73 in FIG. 2 is separated from all of the exit prisms 22 of the exit portion 2c in a specified arrangement state by assuming the largest imaginary spherical surface Fs that satisfies all of Conditions C1 to C4.

(4) According to this embodiment, as shown in FIGS. 2 and 5, the interval Dx between the blades 41 is less than the diameter Dsp of the imaginary spherical shape 73. The blades 41 restrict the imaginary spherical shape 73 from passing between the blades 41 and contacting the exit prisms 22 from one side of the blades 41 in the first direction D1. Therefore, it is possible to restrict the imaginary spherical shape 73 from passing between blades 41 and contacting the exit prism 22, while restricting the imaginary spherical shape 73 from passing between the corner extended outer surface 312 of the terminal cover portion 31 and the terminal blade 42 and contacting the exit prism 22.

(5) According to this embodiment, each of the blades 41 has the front end 411 on the one side in the first direction D1. The surface 411a of the front end 411 is curved with a radius of curvature equal to or greater than the corner radius standard Br in a cross-section perpendicular to the third direction D3 in which the front end 411 extends, i.e., in the cross-section of FIG. 2. Therefore, it is possible to restrict the front end 411 from becoming a sharp corner. In other words, it is possible to ensure the safety of the viewer 70 who may come into contact with the front end 411 of the blade by using the corner radius standard Br defined by the predetermined standard that also defines the imaginary spherical shape 73.

(6) According to this embodiment, the opaque portion of the housing 3 and the blades 41 are matte black. Therefore, compared to a case of a white surface, instead of a matte black surface, it is possible to suppress the incidence of unnecessary light into the light guide 2.

(7) According to this embodiment, the radius of curvature of the convexly curved portion of the corner extended outer surface 312 is 3.2 mm or more. Therefore, the safety of the viewer 70 who may come into contact with the corner extended outer surface 312 can be ensured in accordance with the safety standard for road transport vehicle.

(8) According to this embodiment, the diameter Dsp of the imaginary spherical shape 73 is 165 mm. Therefore, it is possible to restrict the spherical rigid head model defined in the safety standard for road transport vehicle from coming into contact with the exit prism 22 having a pointed shape, from one side in the first direction D1.

Second Embodiment

A second embodiment is explained mainly with respect to points different from the first embodiment. In addition, explanations of the same or equivalent portions as those in the above embodiment is omitted or simplified. The same may be applied to description of embodiments described later.

Figure 12:
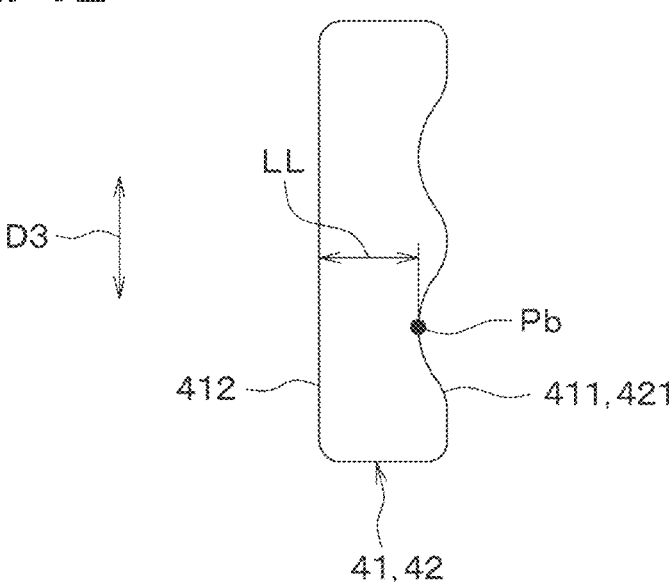
FIG. 12 is a schematic view, seen in an arrow direction XII in FIG. 2, showing a terminal blade of a louver in a second embodiment.

As shown in FIGS. 2 and 12, each of the blades 41 including the terminal blade 42 extends in the third direction D3 while changing a blade width LL between the rear end 412 and the front end 411. Similarly to the first embodiment, the rear end 412 of each of the blades 41 extends linearly in the third direction D3.

Therefore, each of the front ends 411 including the terminal-side front end 421 extends in the third direction D3 while being displaced in the first direction D1. Therefore, the largest imaginary spherical surface Fs in FIG. 2 that satisfies all of Conditions C1 to C4 is in contact with the terminal-side front end 421 at the point Pb where the terminal-side front end 421 is displaced the most toward the other side in the first direction D1. At the point Pb where the terminal-side front end 421 is displaced the most toward the other side in the first direction D1, the blade width LL becomes the shortest in the terminal-side front end 421.

(1) According to this embodiment, the imaginary spherical surface Fs in FIG. 2 is in contact with the terminal-side front end 421 at the point Pb where the terminal-side front end 421 is displaced the most to the other side in the first direction D1. Therefore, even if the terminal-side front end 421 extends in the third direction D3 while bending, the arrangement of the louver 4 can be determined using the imaginary spherical surface Fs so that the imaginary spherical shape 73 in FIG. 2 is separated from all of the exit prisms 22 of the exit portion 2c in a specified arrangement state.

Aside from the above-described aspects, the present embodiment is the same as the first embodiment. Further, in the present embodiment, the same effects as the first embodiment can be obtained in the same manner as in the first embodiment.

Third Embodiment

A third embodiment will be described with respect to points different from the first embodiment.

Figure 13:
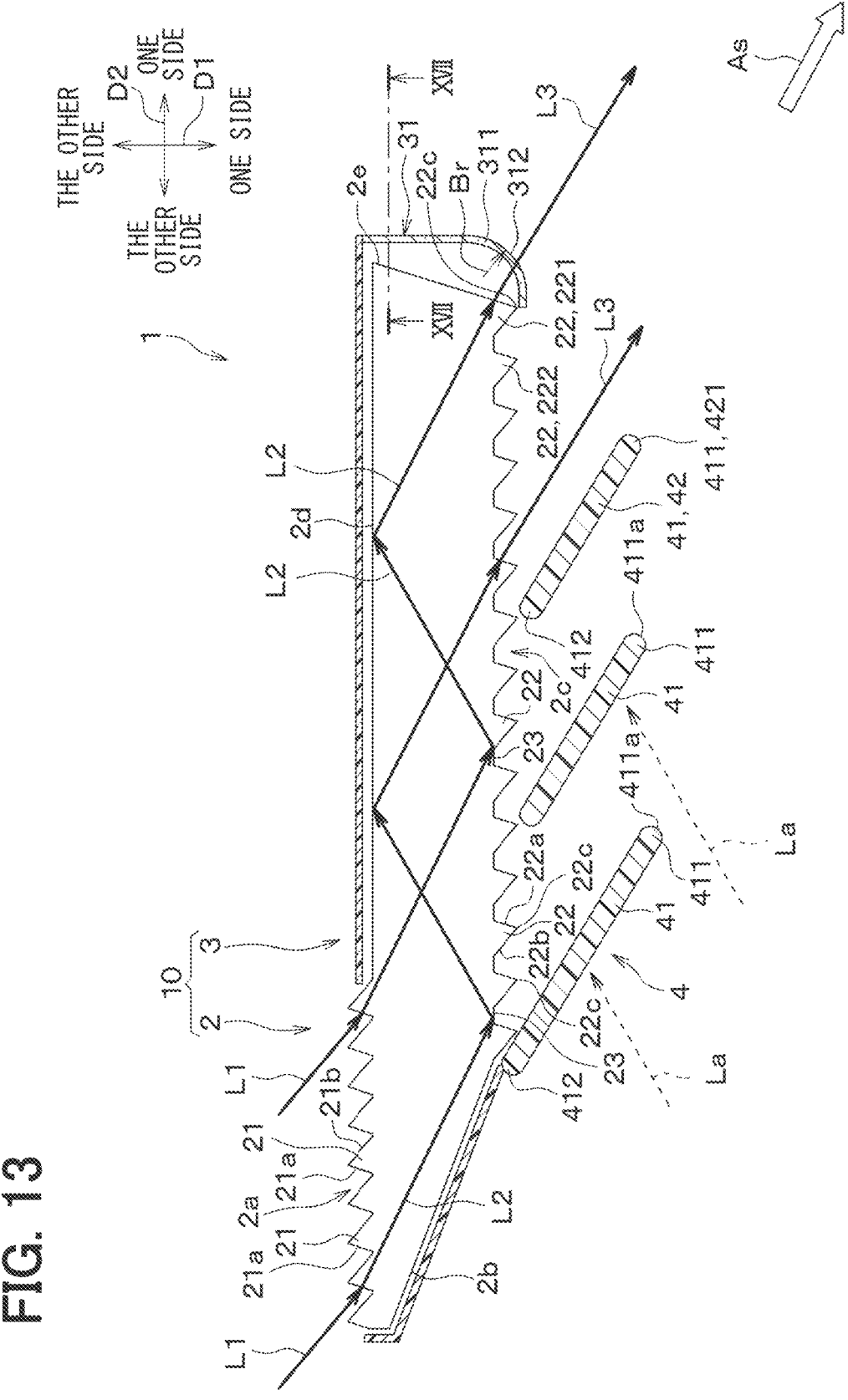
FIG. 13 is a schematic cross-sectional view illustrating an optical device according to a third embodiment, corresponding to FIG. 2.
Figure 14:
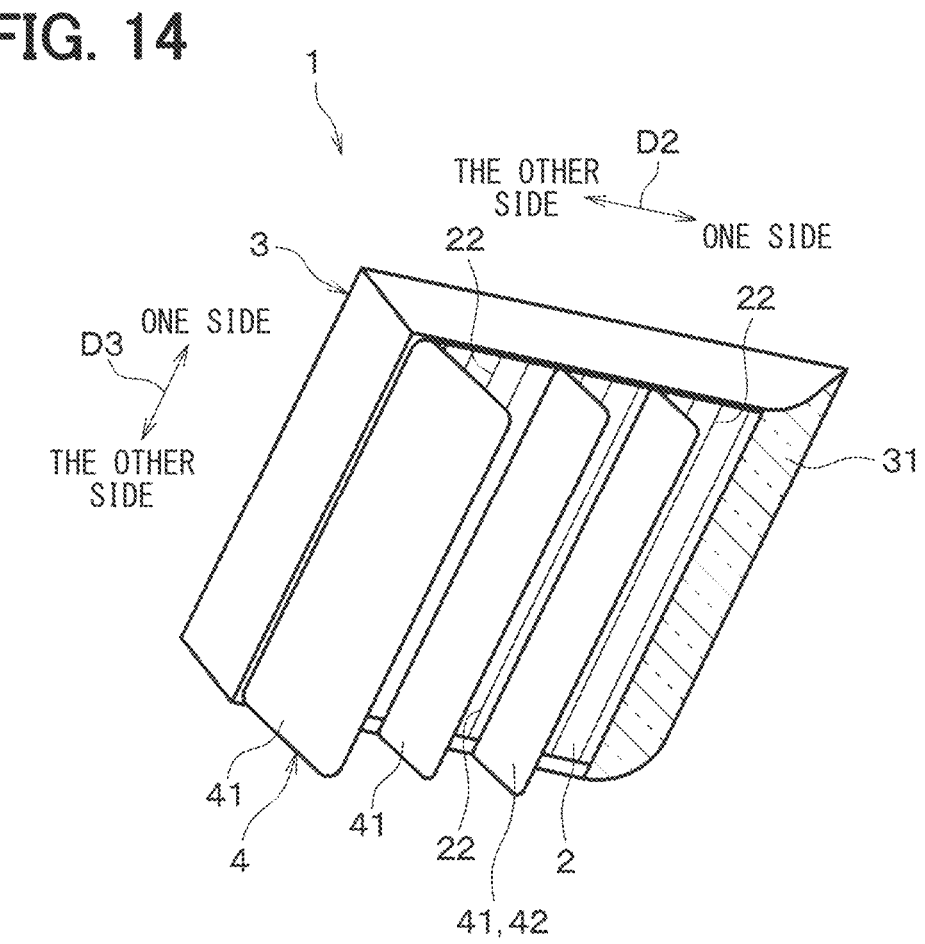
FIG. 14 is a schematic perspective view showing the optical device of the third embodiment, corresponding to FIG. 3.

As shown in FIGS. 13 and 14, in this embodiment, the housing 3 has the terminal cover portion 31 shaped similar to that of the first embodiment. However, the terminal cover portion 31 in this embodiment has a transparent structure. For example, the terminal cover portion 31 of this embodiment is made of a material that is transparent and non-diffusing to visible light, such as acrylic resin, and the entire terminal cover portion 31 is colorless and transparent. Therefore, the corner extended outer surface 312 is also colorless and transparent. The other part of the housing 3 other than the terminal cover portion 31 is matte black and opaque, similar to the first embodiment.

Since the terminal cover portion 31 is transparent, a part of the incident light L2 inside the light guide 2 is transmitted from the terminal surface 2e of the light guide 2 through the terminal cover portion 31 to the outside of the light guide unit 10. In addition, both the inner and outer surfaces of the terminal cover portion 31 are provided with an anti-reflective coating. This anti-reflective coating reduces light reflection from the terminal cover portion 31 itself, making it possible to restrict unnecessary light from reaching the viewing zone of the viewer 70.

Although FIG. 14 is not a cross-sectional view, the transparent portion of the housing 3 is hatched. In a perspective view similar to FIG. 14, which will be described later, the transparent portion of the housing 3 is similarly hatched.

(1) According to this embodiment, the terminal cover portion 31 of the housing 3 has a transparent configuration, and a part of the incident light L2 in the light guide 2 is transmitted from the terminal surface 2e of the light guide 2 through the terminal cover portion 31 to the outside of the light guide unit 10. Therefore, in addition to being able to restrict the imaginary spherical shape 73 from coming into contact with the exit prism 22 by the terminal cover portion 31, the exit light L3 representing the external scene can reach the viewer 70 without blocking the exit light L3 from the terminal surface 2e of the light guide 2.

The present embodiment is similar to the first embodiment, except for the above-described aspects. Thus, in the present embodiment, it is possible to obtain advantages caused by common configurations with the first embodiment, similar to the first embodiment. This embodiment is a modification based on the first embodiment, but it is possible to combine this embodiment with the second embodiment.

Fourth Embodiment

A fourth embodiment is described with respect to points different from the first embodiment.

Figure 15:
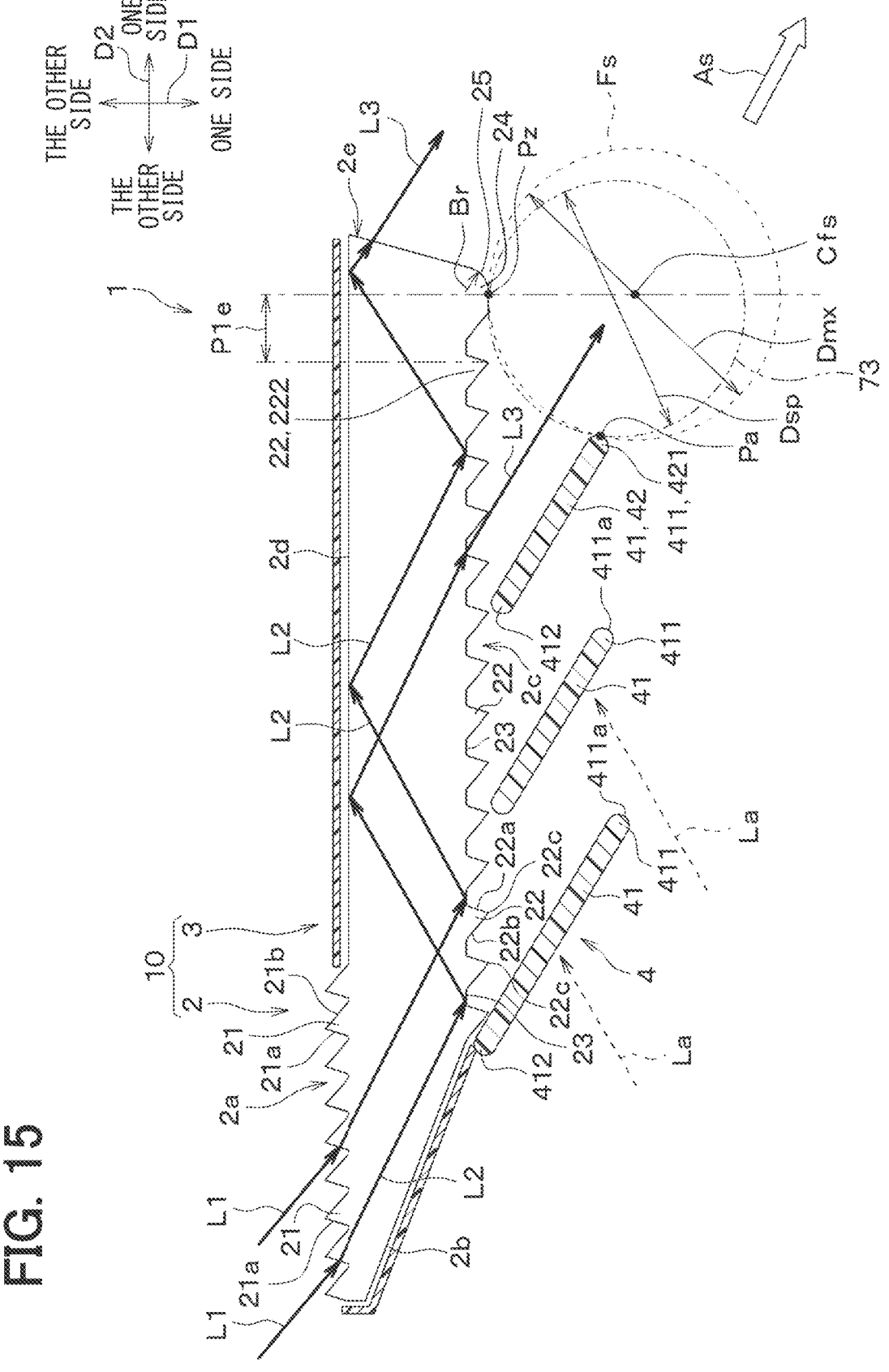
FIG. 15 is a schematic cross-sectional view illustrating an optical device according to a fourth embodiment, corresponding to FIG. 2.
Figure 16:
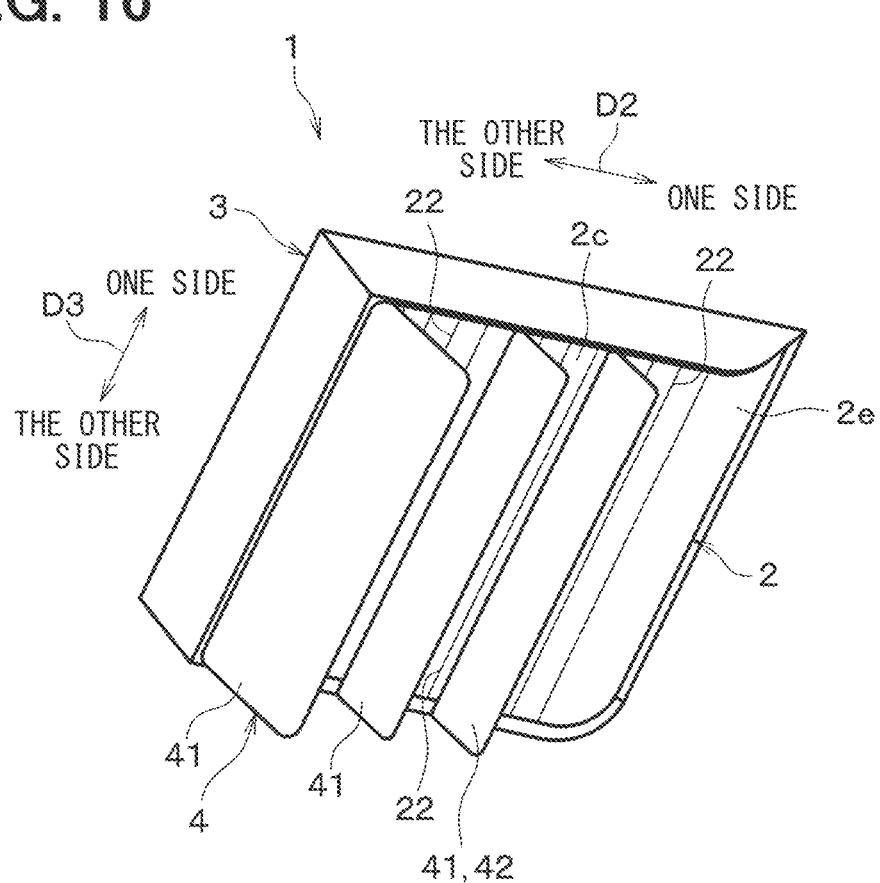
FIG. 16 is a schematic perspective view showing the optical device of the fourth embodiment, corresponding to FIG. 3.

As shown in FIGS. 15 and 16, in this embodiment, the housing 3 does not include the terminal cover portion 31. The terminal surface 2e of the light guide 2 is not covered by the housing 3 and is exposed to the outside of the light guide unit 10. Therefore, instead of the corner 311 of the light guide unit 10 of the first embodiment, the terminal surface 2e of the present embodiment has a corner 24 corresponding to the corner 311 of the first embodiment. A corner extended outer surface 25 of this embodiment, which corresponds to the corner extended outer surface 312 of the first embodiment, is formed as a part of the terminal surface 2e of the light guide 2.

In this embodiment, since the corner extended outer surface 25 is formed on the light guide 2, the exit portion 2c of the light guide 2 does not include the first exit prism 221 of FIG. 2. Therefore, in this embodiment, the second exit prism 222 in the first embodiment becomes the exit prism 22 located the most one side in the second direction D2. Therefore, the second exit prism 222 is called a terminal-side exit prism 222 in this embodiment. This terminal-side exit prism 222 corresponds to a terminal-side prism of the present disclosure.

Just to be clear, the corner 24 of this embodiment has a configuration corresponding to the corner 311 of the first embodiment, and the corner extended outer surface 25 of this embodiment has a configuration corresponding to the corner extended outer surface 312 of the first embodiment. Therefore, for example, the corner 24 in the present embodiment is located at a corner of the light guide unit 10 on one side in the first direction D1 and on one side in the second direction D2. In this embodiment, the corner extended outer surface 25 extends from the corner 24 to the other side in the second direction D2, and is formed as an outer surface of the light guide unit 10 facing the one side in the first direction D1, at the other side of the corner extended outer surface 25 in the second direction D2. The corner extended outer surface 25 includes a curved portion at the corner 24 having a radius of curvature that is greater than or equal to the corner radius standard Br (specifically, a radius of curvature that is greater than or equal to 3.2 mm) and extending from the other side to the one side in the first direction D1 while bending to the other side in the second direction D2.

In this embodiment, the imaginary spherical shape 73 is restricted from passing between the terminal blade 42 and the corner extended outer surface 25 from one side in the first direction D1 and contacting the exit prism 22 of the exit portion 2c, as in the first embodiment. That is, in this embodiment, the louver 4 is disposed so that the imaginary spherical shape 73 is spaced apart from all of the exit prisms 22 of the exit portion 2c in the specified arrangement state shown in FIG. 15. In this embodiment, as in the first embodiment, the specified arrangement state represents a state in which the imaginary spherical shape 73 is closest to the exit prism 22 while contacting the terminal blade 42 and the corner extended outer surface 25 without intersecting the blades 41.

In order to establish a configuration in which the imaginary spherical shape 73 is separated from all of the exit prisms 22 in a specified arrangement state, in this embodiment, as in the first embodiment, the largest imaginary spherical surface Fs that satisfies all of Conditions C1 to C4 in the first embodiment is assumed. In the optical device 1 of this embodiment, Formula F4 of Dmx<Dsp+P1e/2 is satisfied, corresponding to Formula F2.

However, in Formula F4 of this embodiment, P1e is a distance between the most one-side point Pz and the tip 22c of the terminal-side exit prism 222 in the second direction D2. The most one-side point Pz of this embodiment is defined in the same manner as the most one-side point Pz of the first embodiment, but in that definition, the corner extended outer surface 312 of the first embodiment is read as the corner extended outer surface 25 of this embodiment. In addition, the corner extended outer surface 312 in Conditions C1 to C4 in the first embodiment can also be read as the corner extended outer surface 25 in this embodiment.

As shown in FIG. 15, the most one-side point Pz in this embodiment is at the same position as the tip 22c of the terminal-side exit prism 222 in the first direction D1.

(1) According to this embodiment, the corner extended outer surface 25 is formed as a part of the terminal surface 2e of the light guide 2, and the terminal surface 2e is exposed to the outside of the light guide unit 10 without being covered by the housing 3. Therefore, the housing 3 has no wall on one side in the second direction D2, so that the housing 3 can be simplified.

(2) In the optical device 1 of this embodiment, Formula F4 is satisfied. Therefore, by assuming the largest imaginary spherical surface Fs that satisfies all of Conditions C1 to C4, as in the first embodiment, the arrangement of the louver 4 can be determined so that the imaginary spherical shape 73 in FIG. 15 is separated from all of the exit prisms 22 of the exit portion 2c in a specified arrangement state.

Aside from the above-described aspects, the present embodiment is the same as the first embodiment. Further, in the present embodiment, effects similar to those of the first embodiment can be obtained in the same manner as in the first embodiment.

This embodiment is a modification based on the first embodiment, but it is possible to combine this embodiment with the second embodiment.

Fifth Embodiment

A fifth embodiment is described with respect to portions different from the third embodiment.

Figure 17:
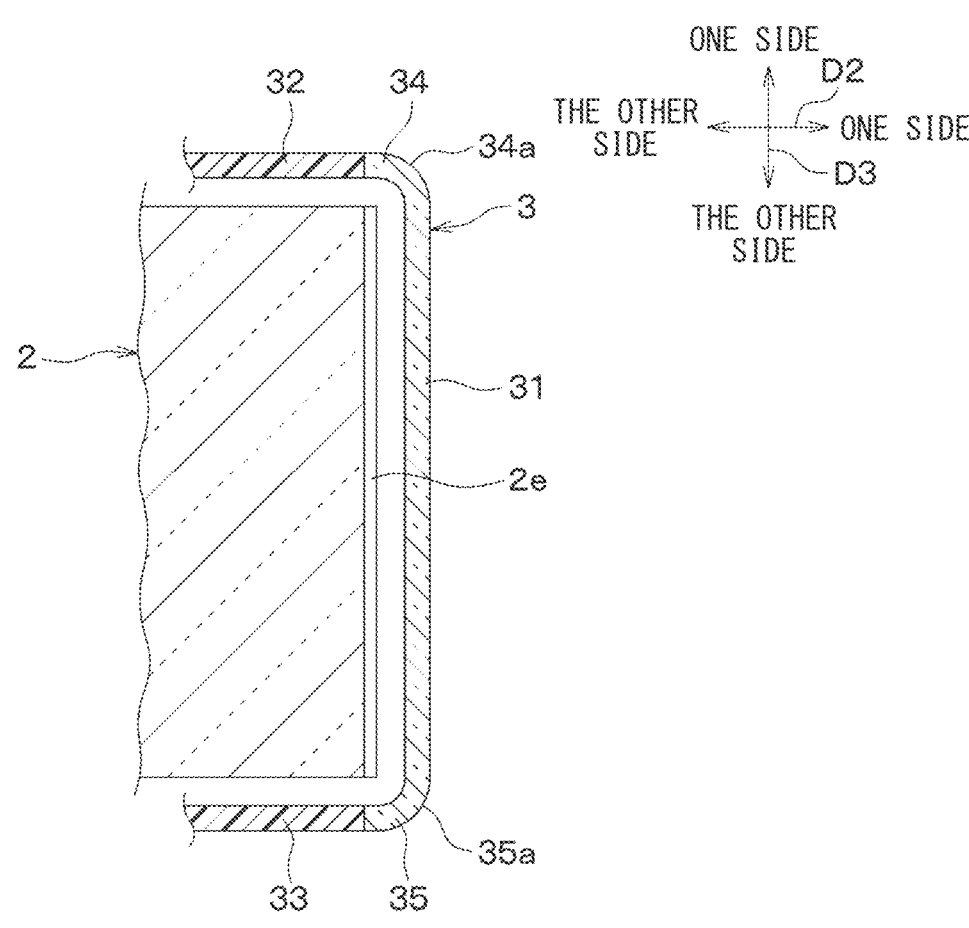
FIG. 17 is a schematic cross-sectional view taken along line XVII-XVII in FIG. 13, illustrating one side corner and the other side corner connected to a terminal cover of a housing in a fifth embodiment.
Figure 18:
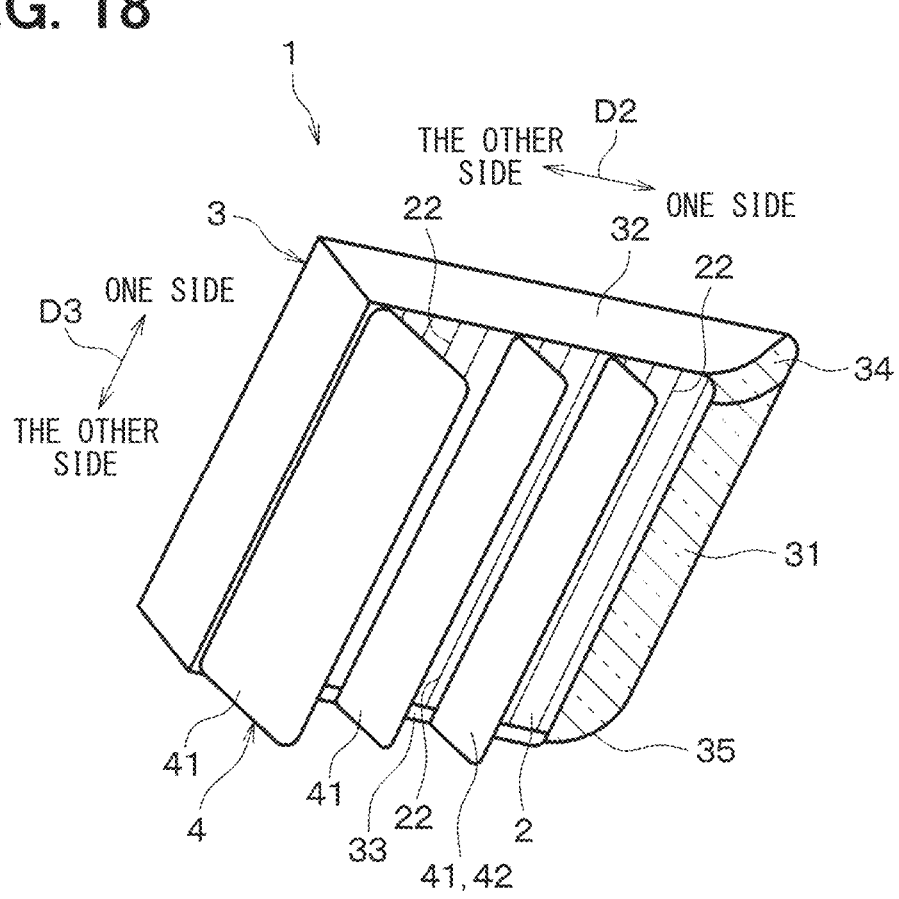
FIG. 18 is a schematic perspective view showing an optical device according to a fifth embodiment, corresponding to FIG. 3.

As shown in FIGS. 13, 17, and 18, the housing 3 of this embodiment has a one-side cover 32 that covers the light guide 2 on one side in the third direction D3, and an other-side cover 33 that covers the light guide 2 on the other side in the third direction D3. The housing 3 has a one-side corner 34 provided between the one-side cover 32 and the terminal cover portion 31 to connect the one-side cover 32 and the terminal cover portion 31. The housing 3 has an other-side corner 35 provided between the other-side cover 33 and the terminal cover portion 31 to connect the other-side cover 33 and the terminal cover portion 31. Each of the one-side corner 34 and the other-side corner 35 extends in the first direction D1. These also apply to the third embodiment.

However, unlike the third embodiment, in this embodiment, the outer surface 34a of the one-side corner 34 is a convex curved surface that smoothly connects from the terminal cover portion 31 to the one-side cover 32. The curved surface expands from the terminal cover portion 31 toward the one-side cover 32 while curving with a radius of curvature equal to or larger than the corner radius standard Br.

Similarly, an outer surface 35a of the other-side corner 35 is a convex curved surface that smoothly connects from the terminal cover portion 31 to the other-side cover 33. The curved surface expands from the terminal cover portion 31 toward the other-side cover 33 while curving with a radius of curvature equal to or larger than the corner radius standard Br.

The one-side corner 34 and the other-side corner 35 are colorless and transparent, similar to the terminal cover portion 31.

According to this embodiment, each of the outer surface 34a of the one-side corner 34 and the outer surface 35a of the other-side corner 35 is a curved surface with a radius of curvature that is equal to or greater than the corner radius standard Br. Therefore, the safety of the viewer 70 can be easily ensured on both sides of the housing 3 in the third direction D3.

Since the one-side corner 34 and the other-side corner 35 are transparent, visibility can be ensured on both sides of the housing 3 in the third direction D3.

Except the above descriptions, the present embodiment is the same as the third embodiment. Thus, this embodiment can achieve the advantages obtained by the configuration common to the third embodiment in a similar manner as in the third embodiment.

Sixth Embodiment

A sixth embodiment is described with respect to points different from the first embodiment.

Figure 19:
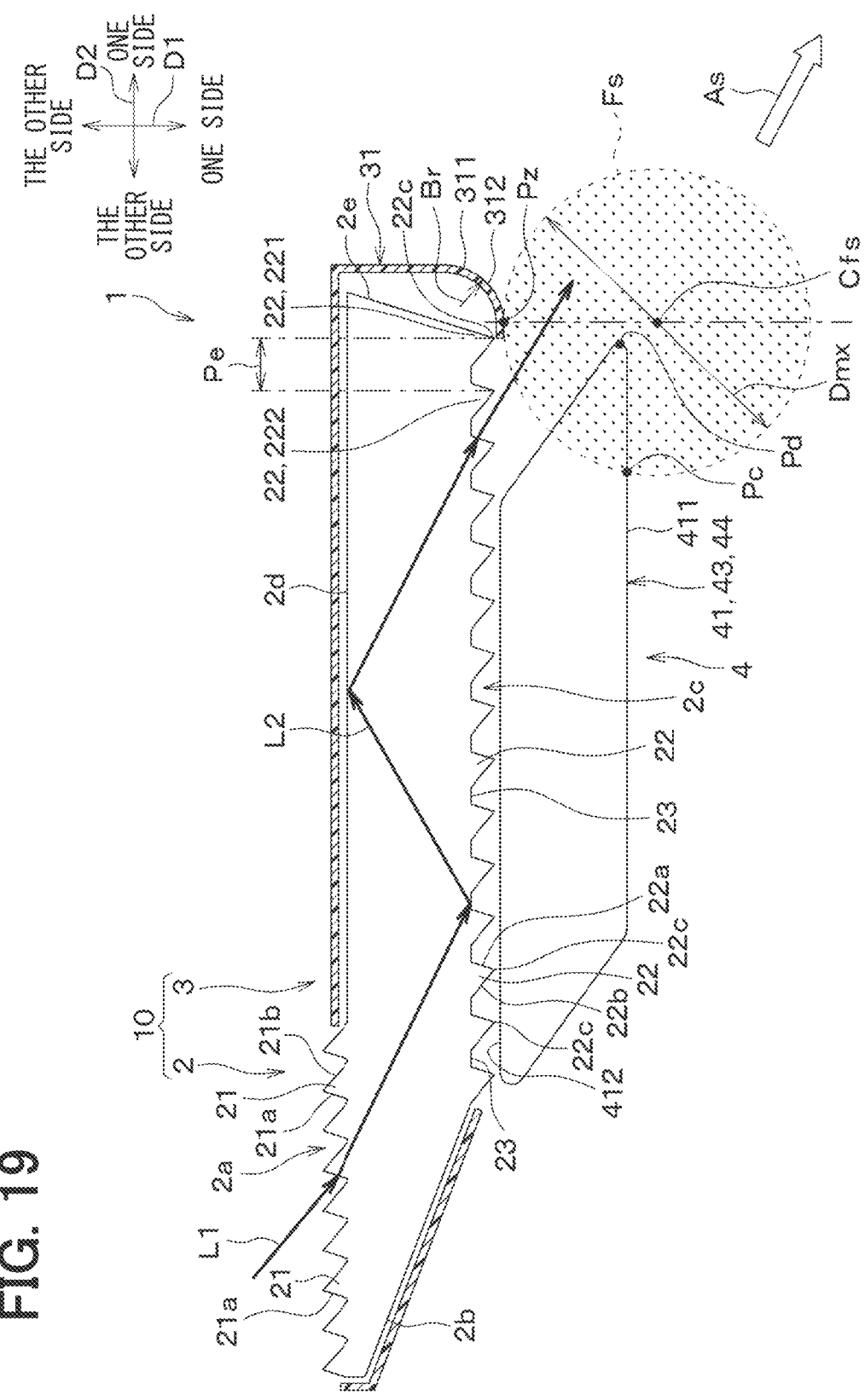
FIG. 19 is a schematic cross-sectional view illustrating an optical device according to a sixth embodiment, corresponding to FIG. 2.
Figure 20:
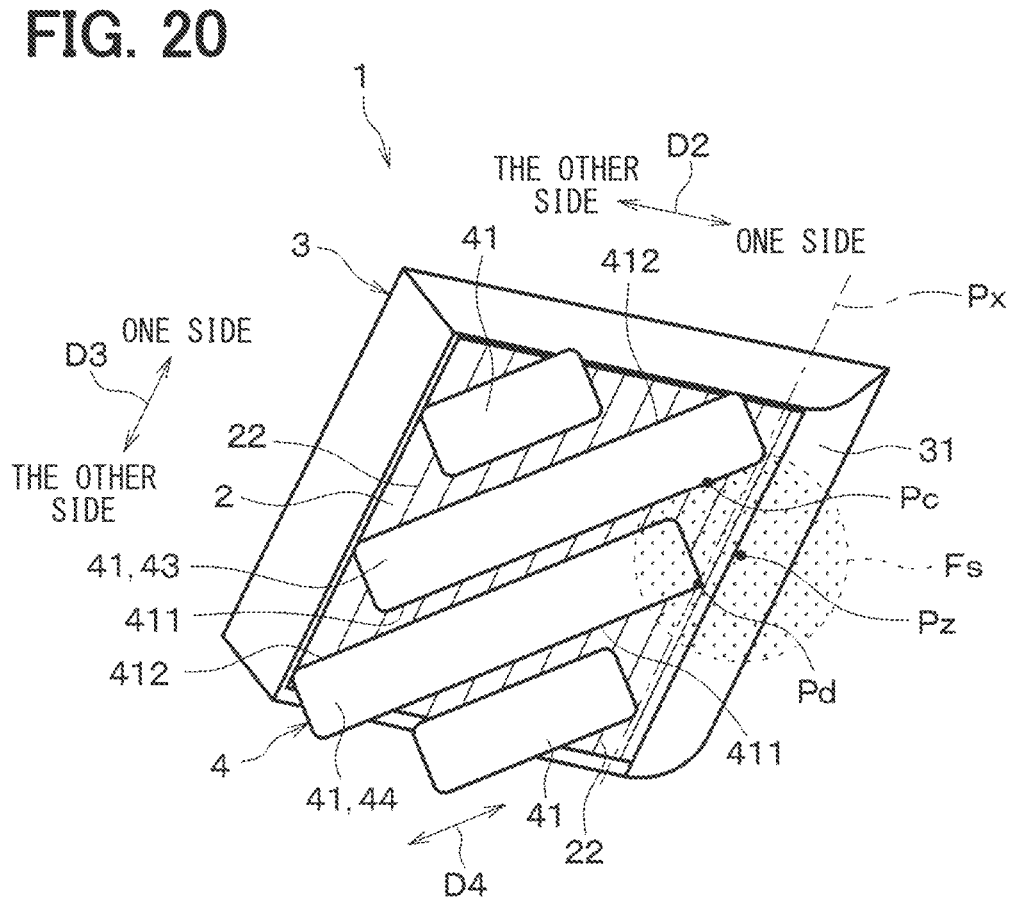
FIG. 20 is a schematic perspective view showing the optical device of the sixth embodiment, corresponding to FIG. 3.

As shown in FIGS. 19 and 20, in this embodiment, the blades 41 of the louver 4 extend along a blade extension direction D4, which is inclined with respect to the second direction D2 and the third direction D3 and perpendicular to the first direction D1. Therefore, among the multiple blades 41, some blades 41 have reached the end position Px on one side of the louver 4 in the second direction D2, and other blades 41 have not reached that end position Px.

The front end 411 and the rear end 412 of each of the blades 41 extend linearly along the blade extension direction D4. In a cross-section perpendicular to the blade extension direction D4, each of the blades 41 is inclined with respect to the first direction D1 so as to be positioned to the one side in the second direction D2 as extending to the one side in the first direction D1.

In this embodiment, as in the first embodiment, the imaginary spherical shape 73 in FIG. 2 is restricted from passing between the louver 4 and the corner extended outer surface 312 from one side in the first direction D1 and contacting the exit prism 22 of the exit portion 2c. In this embodiment, the louver 4 is disposed so that the imaginary spherical shape 73 is spaced apart from all of the exit prisms 22 of the exit portion 2c in a specified arrangement state.

In this embodiment, the arrangement of the blades 41 is different from that in the first embodiment, so that the definition of the specified arrangement state of the imaginary spherical shape 73 is different from that in the first embodiment. In other words, in this embodiment, the specified arrangement state represents a state in which the imaginary spherical shape 73 is closest to the exit prism 22 while contacting one of the blades 41 and the corner extended outer surface 312 without intersecting the blades 41. At this time, the blades 41 in contact with the imaginary spherical shape 73 are two adjacent blades 41 that have reached the end position Px of the louver 4.

In order to establish a configuration in which the imaginary spherical shape 73 is separated from all of the exit prisms 22 in a specified arrangement state, an imaginary spherical surface Fs is assumed in this embodiment as in the first embodiment. In FIGS. 19 and 20, in order to show the imaginary sphere Fs in an easily understandable manner, the imaginary sphere Fs is hatched with dots.

In the optical device 1 of this embodiment, the relationship of Formula F2 holds for the diameter Dmx of the imaginary spherical surface Fs. However, the imaginary spherical surface Fs is the largest spherical surface that satisfies all of Conditions C1 to C3 and C41.

Condition C41: The imaginary spherical surface Fs is in contact with each of two adjacent blades 43, 44 without intersecting with the blades 41.

As shown in FIGS. 19 and 20, the two adjacent blades 43, 44 of Condition C41 are, more specifically, one side blade 43, which is one of the blades 41 adjacent to each other, and the other side blade 44, which is the other of the blades 41. Both of the one side blade 43 and the other side blade 44 have reached the end position Px on one side of the louver 4 in the second direction D2. The imaginary spherical surface Fs comes into contact with the one side blade 43 at a contact point Pc located midway along the front end 411 of the one side blade 43. In contrast, the imaginary spherical surface Fs is in contact with the other side blade 44 at a contact point Pd located at a corner on one side of the front end 411 of the other side blade 44 in the second direction D2.

(1) As described above, in the optical device 1 of this embodiment, the relationship of Formula F2 is satisfied. Therefore, by assuming the imaginary spherical surface Fs, as in the first embodiment, the arrangement of the louver 4 can be determined so that the imaginary spherical shape 73 in FIG. 2 is separated from all of the exit prisms 22 of the exit portion 2c in a specified arrangement state.

This embodiment is the same as the first embodiment, except for the above-described aspects. Thus, in the present embodiment, it is possible to obtain advantages caused by common configurations with the first embodiment.

Although the present embodiment is a modification based on the first embodiment, the present embodiment can be combined with any of the second to fifth embodiments.

Modification of Sixth Embodiment

This modification is a combination of the sixth embodiment and the fourth embodiment. That is, the louver 4 in the fourth embodiment is replaced with that in the sixth embodiment, and the other configurations are the same as those in the fourth embodiment. In this modification, the imaginary spherical surface Fs is set to the largest spherical surface that satisfies all of Conditions C1 to C3 and C41, similarly to the sixth embodiment. However, for the diameter Dmx of the imaginary spherical surface Fs, the relationship of Formula F4 is satisfied, instead of Formula F2. In the definition of the most one-side point Pz in this modification, in Conditions C1 to C3 and C41, the corner extended outer surface 312 of the sixth embodiment is replaced with the corner extended outer surface 25 of the fourth embodiment, as in the fourth embodiment.

Other Embodiments (1) In each of the embodiments, as shown in FIG. 1, the optical device 1 is an in-vehicle device. However, the optical device 1 may be mounted on something other than a vehicle.

(2) In each of the embodiments, the louver 4 has the blades 41, for example, as shown in FIG. 2. However, this is merely an example. For example, if the dimension of the light guide 2 in the second direction D2 is short, it is conceivable that the louver 4 has only one blade 41.

(3) In each of the embodiments, as shown in FIG. 2, for example, when viewed in a direction along the third direction D3, the corner extended outer surface 312 is composed of a corner round surface and an extension surface extending from the corner round surface to the other side in the second direction D2, but this is just one example. For example, the extension surface may be omitted, and the corner extended outer surface 312 may be composed of only the corner round surface.

(4) In each of the embodiments, the imaginary spherical shape 73 and the corner radius standard Br shown in FIG. 2 are determined by a predetermined standard, namely, the safety standard for road transport vehicle, but this is merely an example. The standard that defines the imaginary spherical shape 73 and the corner radius standard Br may be a standard other than the safety standard for road transport vehicle.

(5) In the fourth embodiment, as shown in FIG. 15, the most one-side point Pz on the corner extended outer surface 25 is at the same position as the tip 22c of the terminal side exit prism 222 in the first direction D1, but this is just one example. For example, the corner extended outer surface 25 may be formed so that the most one-side point Pz is located on one side of the tip 22c of the terminal side exit prism 222 in the first direction D1.

(6) The present disclosure is not limited to the above-described embodiments, and may be implemented in various modifications. In addition, the embodiments are not unrelated to each other, and may be appropriately combined unless the combination is obviously impossible.

Individual elements or features of a particular embodiment are not necessarily essential unless it is specifically stated that the elements or the features are essential in the foregoing description, or unless the elements or the features are obviously essential in principle. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Furthermore, a material, a shape, a positional relationship, or the like, if specified in the above-described embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

What is claimed is:

1. An optical device comprising:
a light guide made of a light-transmitting material and having
an incident portion into which an external scene light is incident,
an exit portion forming an outer surface located on one side in a first direction, and
a terminal portion forming an outer surface located on one side in a second direction perpendicular to the first direction, opposite to the incident portion in the second direction;
a holding member that partially covers the light guide and holds the light guide; and
a louver disposed on the one side of the exit portion in the first direction and having at least one blade held by the holding member to suppress an incidence of external light into the exit portion, wherein
the exit portion has a plurality of prisms formed in a protruding shape aligned in the second direction to transmit a part of an incident light incident from the incident portion into the light guide to outside of the light guide,
the light guide and the holding member constitute a light guide unit,
the light guide unit has
a corner located on the one side of the light guide unit in the first direction and on the one side of the light guide unit in the second direction, and
a corner extended outer surface extended from the corner to the other side in the second direction and formed as an outer surface facing the one side in the first direction at the other side in the second direction,
the corner extended outer surface includes a curved surface having a radius of curvature of a predetermined standard or more at the corner and extended from the other side to the one side in the first direction while bending toward the other side in the second direction,
the corner extended outer surface is formed as a part of the terminal portion or as a part of a terminal cover portion of the holding member that covers the terminal portion,
the louver is arranged such that an imaginary spherical shape of the predetermined standard is spaced apart from the prisms in a state where the imaginary spherical shape is closest to the prisms while being in contact with the louver and the corner extended outer surface without intersecting the blade, and
the radius of curvature of the curved surface of the corner extended outer surface and the imaginary spherical shape are determined based on the predetermined standard.

2. The optical device according to claim 1, wherein
the exit portion has, in addition to the plurality of prisms, a plurality of flat surfaces to reflect a part of the incident light into the light guide, and
the light guide has a reflective surface formed as an outer surface facing the other side in the first direction, to reflect the incident light reflected by the flat surfaces toward the exit portion.

3. The optical device according to claim 1, wherein
the holding member has the terminal cover portion, and
the corner extended outer surface is formed as a part of the terminal cover portion.

4. The optical device according to claim 3, wherein
the terminal cover portion is transparent, and
a part of the incident light in the light guide is transmitted from the terminal portion through the terminal cover portion to an outside of the light guide unit.

5. The optical device according to claim 3, wherein
the at least one blade extends in a third direction perpendicular to the first direction and the second direction, and includes a terminal-side blade closest to the terminal portion in the second direction,
the terminal-side blade has a front end extended in the third direction and located on the one side in the first direction,
the plurality of prisms includes a first prism located closest to the terminal portion in the second direction, and a second prism adjacent to the first prism,
the terminal cover portion extends to cover a tip of the first prism,
the curved surface of the corner extended outer surface has a most one-side point located outermost in the first direction, and
a relationship of Dmx<Dsp+Pe/2 is satisfied, in which
Dmx represents a diameter of a largest imaginary spherical surface that has a spherical center at a same position in the second direction as the most one-side point and is located on the one side of the corner extended outer surface in the first direction to pass through the most one-side point to be tangent to the front end of the blade,
Dsp represents a diameter of the imaginary spherical shape, and
Pe represents a pitch between the first prism and the second prism in the second direction.

6. The optical device according to claim 5, wherein
the front end of the blade extends in the third direction while being displaced in the first direction, and
the imaginary spherical surface is in contact with the front end of the blade at a point where the front end of the blade is most displaced toward the other side in the first direction.

7. The optical device according to claim 3, wherein
the at least one blade includes a plurality of blades arranged at interval from each other,
each of the plurality of blades extends in a direction inclined with respect to the second direction and perpendicular to the first direction,
the plurality of prisms includes a first prism located closest to the terminal portion in the second direction and a second prism adjacent to the first prism,
the terminal cover portion extends to cover a tip of the first prism,
the curved surface of the corner extended outer surface has a most one-side point located outermost in the first direction, and
a relationship Dmx<Dsp+Pe/2 is satisfied, in which
Dmx represents a diameter of a largest imaginary spherical surface that has a spherical center at a same position in the second direction as the most one-side point and is located on the one side of the corner extended outer surface in the first direction to pass through the most one-side point to be in contact with each of two adjacent blades of the plurality of blades without intersecting the plurality of blades,
Dsp represents a diameter of the imaginary spherical shape, and
Pe represents a pitch between the first prism and the second prism in the second direction.

8. The optical device according to claim 1, wherein
the corner extended outer surface is formed as a part of the
terminal portion, and
the terminal portion is exposed to an outside of the light
guide unit.

9. The optical device according to claim 8, wherein
the at least one blade extends in a third direction perpen-
dicular to the first direction and the second direction,
and includes a terminal-side blade closest to the termi-
nal portion in the second direction,
the terminal-side blade has a front end extended in the
third direction and located on the one side in the first
direction,
the plurality of prisms includes a terminal-side prism
closest to the terminal portion in the second direction,
the curved surface of the corner extended outer surface
has a most one-side point located outermost in the first
direction,
a relationship of Dmx<Dsp+P1e/2 is satisfied, in which
Dmx represents a diameter of a largest imaginary spheri-
cal surface that has a spherical center at a same position
in the second direction as the most one-side point and
is located on the one side of the corner extended outer
surface in the first direction to pass through the most
one-side point to be tangent to the front end of the
blade,
Dsp represents a diameter of the imaginary spherical
shape, and
P1e represents a distance in the second direction between
the most one-side point and a tip of the terminal-side
prism, and
the most one-side point is located at a same position in the
first direction as the tip of the terminal-side prism or at
a position on the one side of the tip of the terminal-side
prism in the first direction.

10. The optical device according to claim 8, wherein
the at least one blade includes a plurality of blades
arranged at interval from each other,
each of the plurality of blades extends in a direction
inclined with respect to the second direction and per-
pendicular to the first direction,
the plurality of prisms includes a terminal-side prism
located closest to the terminal portion in the second
direction,
the curved surface of the corner extended outer surface
has a most one-side point located outermost in the first
direction, a relationship of Dmx<Dsp+P1e/2 is satisfied, in which
Dmx represents a diameter of a largest imaginary spheri-
cal surface that has a spherical center at a same position
in the second direction as the most one-side point and
is located on the one side of the corner extended outer
surface in the first direction to pass through the most
one-side point to be in contact with each of two
adjacent blades of the plurality of blades without inter-
secting the plurality of blades,
Dsp represents a diameter of the imaginary spherical
shape, and
P1e represents a distance in the second direction between
the most one-side point and a tip of the terminal-side
prism, and
the most one-side point is located at a same position in the
first direction as the tip of the terminal-side prism or at
a position on the one side of the tip of the terminal-side
prism in the first direction.

11. The optical device according to claim 1, wherein
the at least one blade includes a plurality of blades
arranged at interval from each other,
an interval of the blades is less than a diameter of the
imaginary spherical shape, and
the plurality of blades restricts the imaginary spherical
shape from passing between the plurality of blades
from the one side in the first direction and contacting
the plurality of prisms.

12. The optical device according to claim 1, wherein
the at least one blade includes a plurality of blades
arranged at interval from each other,
each of the plurality of blades has a front end located on
the one side in the first direction, and
a surface of the front end of the blade is curved with a
radius of curvature equal to or greater than a standard
value determined in the predetermined standard in a
cross-section perpendicular to an extension direction of
the front end of the blade.

13. The optical device according to claim 1, wherein an
opaque portion of the holding member and the at least one
blade are matte black.

14. The optical device according to claim 1, wherein the
radius of curvature of the curved surface of the corner
extended outer surface is 3.2 mm or more.

15. The optical device according to claim 1, wherein a
diameter of the imaginary spherical shape is 165 mm.

* * * * *